(12) United States Patent
Goren

(10) Patent No.: US 8,021,157 B2
(45) Date of Patent: Sep. 20, 2011

(54) INTUITIVELY ORDERED TACTILE CHARACTERS READABLE BY VISUALLY IMPAIRED PERSONS

(75) Inventor: Michael Goren, Albany, NY (US)

(73) Assignee: Prevalent Devices LLC, Albany, NY (US)

( * ) Notice: Subject to any disclaimer, the term of this patent is extended or adjusted under 35 U.S.C. 154(b) by 365 days.

(21) Appl. No.: 12/463,075

(22) Filed: May 8, 2009

(65) Prior Publication Data

US 2010/0285432 A1     Nov. 11, 2010

(51) Int. Cl.
    *G09B 21/00* (2006.01)
(52) U.S. Cl. ........................................ 434/114
(58) Field of Classification Search ........ 434/112, 434/113, 114, 115, 116, 117; 400/109, 109.1; 283/117
    See application file for complete search history.

(56) References Cited

U.S. PATENT DOCUMENTS

| | | | |
|---|---|---|---|
| 1,021,189 A * | 3/1912 | Hill | ................. 283/17 |
| 3,197,889 A | 8/1965 | Micropoulou | |
| 3,363,339 A | 1/1968 | Place | |
| 4,404,764 A | 9/1983 | Wills | |
| 4,737,108 A | 4/1988 | Chepaitis | |
| 5,286,204 A * | 2/1994 | Minardi | ................. 434/113 |
| D455,776 S * | 4/2002 | Gardner | ................. D18/24 |
| 6,741,235 B1 | 5/2004 | Goren | |
| 6,980,200 B2 | 12/2005 | Goren | |
| 7,190,351 B1 | 3/2007 | Goren | |
| 7,306,463 B2 * | 12/2007 | Hanley | ................. 434/113 |
| 7,321,360 B1 | 1/2008 | Goren | |
| 7,446,755 B1 | 11/2008 | Goren | |
| 7,548,231 B1 | 6/2009 | Goren | |

* cited by examiner

*Primary Examiner* — Kurt Fernstrom
(74) *Attorney, Agent, or Firm* — Heslin Rothenberg Farley & Mesiti P.C.

(57) ABSTRACT

A reduced number of selectable inputs that enable efficient communication. Simplified tactile and optically machine readable code of raised embossments, particularly for unsighted and visually impaired persons is provided, in which each character is represented by a cell of indicia of an intuitive systematic code. For the alphabet, the cells are configured in ordered positions, which correspond to the order of the alphabet, and thereby, assist in tactile perception so that a person may easily identify the character by touch. Also, optical machines are enabled to easily read the characters; and a keyboard is provided for producing the same.

21 Claims, 25 Drawing Sheets

PERIOD

COMMA

QUESTION MARK

APOSTROPHE

EXCLAMATION

PLUS +

MINUS -

EQUALS =

PERCENT %

DOLLAR SIGN $

INTUITIVELY ORDERED TACTILE CHARACTERS READABLE BY VISUALLY IMPAIRED PERSONS

TECHNICAL FIELD

The present invention relates, in general, to touch reading, and in particular, to a tactile system that is intuitive and improves readability.

BACKGROUND OF THE INVENTION

Tactile systems, such as Braille, are widely used by visually impaired persons, including blind and low-vision persons, to enable them to touch read written text. Braille is a system of touch reading which employs raised dots evenly arranged in quadrangular letter spaces or cells. Braille cells are made up of a plurality of positions that are populated by the raised dots to provide characters (e.g., letters of the alphabet or numbers), while other positions are left blank. Each particular configuration of raised dots represents a letter of the alphabet, a numeral or other symbol.

Improvements and/or alternatives to Braille have been described over the years. Some of these improvements/alternatives are described in the following patents: U.S. Pat. No. 3,197,889, entitled "Method of Forming Letters and Numbers Readable by the Blind," Micropoulou, issued Aug. 3, 1965; U.S. Pat. No. 3,363,339, entitled "Braille Cell Structure, Place, issued Jan. 16, 1968; U.S. Pat. No. 4,404,764, entitled "Message Medium Having Corresponding Optical and Tactile Messages," Wills, et al., issued Sep. 20, 1983; , and U.S. Pat. No. 4,737,108, entitled "Tactile Code for the Visually Impaired and Blind," Chepaitis, issued Apr. 12, 1988, each of which is hereby incorporated herein by reference in its entirety.

The conventional Braille system requires a high-level of skill and is not as intuitive as desired. Additionally, it and alternative systems require significant cognitive resources.

SUMMARY OF THE INVENTION

Based on the foregoing, a need exists for a new tactile system that is more intuitive and has improved readability.

The shortcomings of the prior art are overcome and additional advantages are provided through the provision of a tactile code for visually impaired persons. The tactile code includes, for instance, a plurality of tactile perceptible cells, wherein each character of an alphabet is represented by one cell of the plurality of tactile perceptible cells and each one cell has a specific raised pattern, wherein a cell of the plurality of tactile perceptible cells includes a first region having a plurality of positions for use in indicating a plurality of lead characters, wherein a lead character of the plurality of lead characters is the lead character in a specific sequence of characters of the alphabet; a second region having a plurality of positions different from the plurality of positions of the first region, the plurality of positions in the second region for use in indicating a particular character from a set of characters of the alphabet, the set of characters including the lead character and a number of characters following the lead character in alphabetical order, the number of characters being less than the number of characters in the alphabet, and wherein the set of characters is different from one or more other sets of characters; a third region having a plurality of raised projections to assist in tactual perceptible identification of cell positions in the first region and the second region, wherein the plurality of raised projections include at least a number of raised projections equal to a number of positions in at least one of the first region and the second region, and wherein the plurality of raised projections indicate an ordinal position of the plurality of projections and each position in the first region and the second region corresponds to a specific raised projection; and a first raised perceptible indicium in one position in the first region and a second raised perceptible indicium in one or more positions of the second region which in combination indicate an intended character of the alphabet.

In a further embodiment, a tactile code is provided, which includes, for instance, a plurality of tactile perceptible cells, wherein each character of an alphabet is represented by one cell of the plurality of tactile perceptible cells and each one cell has a specific raised pattern, wherein a cell of the plurality of tactile perceptible cells includes a first region having a plurality of positions for use in indicating a plurality of lead characters, wherein a lead character of the plurality of lead characters is the lead character in a specific sequence of characters of the alphabet; a second region having a plurality of positions different from the plurality of positions of the first region, the plurality of positions in the second region for use in indicating a particular character from a set of characters of the alphabet, the set of characters including the lead character and a number of characters following the lead character in alphabetical order, the number of characters being less than the number of characters in the alphabet, and wherein the set of characters is different from one or more other sets of characters; and a first raised perceptible indicium in one position in the first region and a second raised perceptible indicium in one or more positions of the second region which in combination indicate an intended character of the alphabet.

Additional tactile codes, methods, systems, devices and computer program products relating to one or more aspects of the present invention are also described and claimed herein.

Additional features and advantages are realized through the techniques of the present invention. Other embodiments and aspects of the invention are described in detail herein and are considered a part of the claimed invention.

BRIEF DESCRIPTION OF THE DRAWINGS

One or more aspects of the present invention are particularly pointed out and distinctly claimed as examples in the claims at the conclusion of the specification. The foregoing and other objects, features, and advantages of the invention are apparent from the following detailed description taken in conjunction with the accompanying drawings in which:

DETAILED DESCRIPTION OF THE INVENTION

Figure 1:
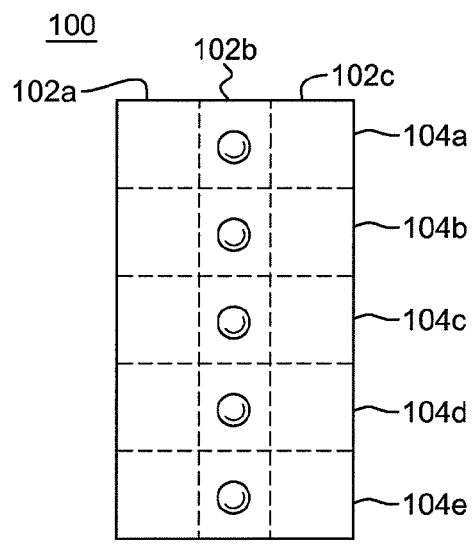
FIG. 1 is a plan view of one embodiment of a cell of the present invention including a raised projection of a particular shape in each position of a second column of the cell and devoid of any raised indicia in the first or third columns of the cell, in accordance with an aspect of the present invention.

In accordance with an aspect of the present invention, a tactile system is provided that is intuitive and easy to use. The tactile system includes a tactile code usable to provide characters for touch reading, including letters of the alphabet, numerals, punctuation and other symbols. The tactile code can be handwritten or otherwise provided on any tangible media, including, but not limited to, paper, plastic, metal, cloth, recordable media, wood, cardboard, plaques, tape, or any other surfaces or media that can have or support raised perceptible indicia and/or projections. The tactile code is placed on the media by any technique that provides raised indicia or projections, including, but not limed to, hand writing or using a typing or embossing apparatus or any other apparatus capable of providing raised indicia/projections. In one example, the typing or embossing apparatus uses a keyboard configured in accordance with an aspect of the present invention. Further, the tactile code is machine readable by, for instance, a scanner, in a further aspect of the present invention. One example of a scanner is a bar code scanner commonly employed in commerce.

As one example, the tactile system uses cells to represent characters. Each cell includes, for instance, a plurality of raised indicia perceptible by touch. As used herein, the term raised indicia includes indicia raised in any manner in any shape, which is discernible by touch. Each cell also includes one or more raised projections (e.g., dots, bumps, extensions, raised letters, characters) of any shape that are usable for orientation within the cell. The cells are configured to associate the order and positioning of the raised indicia to represent characters, including, for instance, letters of the alphabet, numerals, punctuation and/or other symbols.

In one particular example, a rectangular cell has three vertical columns (also referred to as regions) and five horizontal rows on a surface, such as a sheet of paper, plastic, metal or other medium. Raised indicia/projections are provided on the surface within the cell in different combinations of positions to indicate orientation within the cell and configured in a pattern to associate the order and positioning of raised indicia to represent the letters of the alphabet, numerals, punctuation or symbols to create tactically distinct characters. As an example, each letter is formed in a cell composed of one indicium in a first region (e.g., column 1) and one or more indicia in a second region (e.g., column 3). The letter is read by a person either visually or by touch guided by the raised projections in a third region (e.g., column 2). The raised projections in the third region facilitate a determination of the row of the cell in which the first region indicia and the row in which the second region indicia are positioned.

In accordance with an aspect of the present invention, the configurations of the raised indicia are based on a binary technique that recognize that the alphabet is divided into five proper vowels, and each vowel has no more than five consonants following it in alphabetical sequence. Therefore, the alphabet has five proper vowels, whose sequence is known as A, E, I, O, and U. The vowels are referred to herein as lead characters, since each vowel has immediately following it, in alphabetical sequence, a number of consonants. For instance, the first vowel A is followed by the consonants B, C and D.

The second vowel E is followed by the consonants F, G and H. The third vowel I is followed by the consonants J, K, L, M, and N. The fourth vowel O is followed by the consonants P, Q, R, S, and T; and the last vowel U is followed by the consonants V, W, X, Y, and Z. This binary system is described in the following patents and applications: U.S. Pat. No. 6,741,235, entitled "Rapid Entry of Data and Information on a Reduced Size Input Area," Goren, issued May 25, 2004; U.S. Pat. No. 6,980,200, entitled "Rapid Entry of Data and Information on a Reduced Size Input Area," Goren, issued Dec. 27, 2005; U.S. Pat. No. 7,190,351, entitled "System and Method for Data Input, Goren, issued Mar. 13, 2007; U.S. Pat. No. 7,321, 360, entitled""System, Methods and Devices for Efficient Communication Utilizing a Reduced Number of Selectable Inputs," Goren, issued Jan. 22, 2008; U.S. Pat. No. 7,446,755, entitled "Input Device and Method for Entering Data Employing a Toggle Input Control," Goren, issued Nov. 4, 2008; and U.S. Ser. No. 11/316,079, entitled "Devices Having Input Controls For Efficient Input Of Data," Goren, filed Dec. 22, 2005, each of which is hereby incorporated herein by reference in its entirety.

With this binary system in mind, further details regarding the cells used in the tactile system of one or more aspects of the present invention are described below, with reference to the figures.

Cells:

As one particular example, a cell 100 (FIG. 1) includes three columns side by side, referred to as a first indicia column 102*a*, an orientation column 102*b*, and a second indicia column 102*c*, and five rows 104*a*-104*e*. Each column includes, for instance, five positions, one position for each of the five rows. Although each column has five positions, positions 1-5 are in the first indicia column and position 6-10 are in the second indicia column, while the positions of the orientation column are not numbered. Thus, in one embodiment, the first position is at the top in the first row of column 1; the second position is in the second row, column 1, . . . and the fifth position is in the last row, column 1. Further, the sixth position is in column 3, first row; the seventh position is in column 3, second row . . . and the tenth position is in column 3, fifth row.

In this example, each column is considered a region of the cell, in which the indicia columns are the first and second regions, in any order, and the orientation column is referred to as the third region. The regions are numbered just for clarity and no particular meaning is assigned to each number. Further, any column can be any region. Yet further, as described in the examples below, a region can be other than a column, such as a row, part of a row, part of a column, etc.

The First Indicia Column:

In different embodiments of the present invention, the first indicia column may be positioned so as to appear side by side to the left of the orientation column or to the right of the orientation column. In the examples described herein, it is to the left of the orientation column. This column, whether on the left or the right, is referred to herein as the vowel (or lead) column. For each cell to indicate a distinct letter, a particular raised indicium (e.g., a star) in the vowel column is arranged in one of the following rows: row one, row two, row three, row four or row five of the vowel column. A raised star that appears in the first row on top of the vowel column correspond to the vowel A. A raised star that appears in the second row of the vowel column (see, e.g., FIGS. 2 and 3) corresponds to the vowel E. A raised star in the vowel column in the third row, corresponds to the vowel I. A raised star that appears in the fourth row of the vowel column corresponds to the vowel O. Finally, a raised star in the vowel column in the fifth row corresponds to the vowel U. This configuration retains the familiar alphabetical sequence of the vowels.

A raised star in any of the five positions (rows) of the first (vowel) column corresponds not only to the vowel in that position, but also to a subset of characters that is based on the vowel and provided in alphabetical order. Accordingly, in the first indicia column, the first position corresponds to the vowel A, and therefore, the subset includes B, C, D; the second position of the first indicia column corresponds to the vowel E, and therefore, the subset includes F, G, H; the third position of the first indicia column corresponds to the vowel I, and therefore, the subset includes J, K, L, M, N; the fourth position of the first column corresponds to the vowel O, and therefore, the subset includes P, Q, R, S, T; and the fifth position of the first indicia column corresponds to the vowel U, and therefore, the subset includes V, W, X, Y, Z.

The Orientation Column:

In one aspect of the present invention, the orientation column (also referred to as a middle or central column) includes a plurality (e.g., five) of raised projections (e.g., dots, bumps, extensions, etc.), positioned one to a row, top to bottom, to provide tactile orientation. These raised projections let the user know in which row raised indicia in the left column and right column are placed to represent an alphabetical or numerical character or other symbol. In the orientation column, the first raised indicia identifies the first row. Touching the first and second projections in the orientation column indicates the second row. Using touch, when the user passes a finger or instrument over the orientation column and feels the first, second and third raised projections, this indicates the third row. Similarly, touching the first, second, third and fourth projections in the orientation column lets the user distinguish the fourth row; and passing a finger or instrument over the first, second, third, fourth and fifth raised projections indicates the fifth row of the orientation column.

The Second Indicia Column:

In different embodiments of the present invention, the second indicia column may be positioned so as to appear side by side to the right of the orientation column or to the left of the orientation column. In the examples described herein, it is to the right of the orientation column. This column is referred to herein as the consonants column. The second indicia column is arranged so that a raised indicium may appear in any of the following rows: row one, row two, row three, row four or row five of the second indicia column.

For each cell to indicate a distinct letter, in one example, a raised star appears in one of the positions in the vowel column and one or more raised indicia (e.g., a star, a dash) appear in one or more of the positions in the consonant column. As an example, a raised star that appears in the first row on top of the vowel column corresponds to the vowel A. That is, where the user touches the first raised dot of the orientation column and also the raised star in the first position of the first column simultaneously, the user is enabled to discern that the pattern of this cell is based on the letter A (i.e., the cell is for the vowel A or a consonant based on the vowel A: B, C, D). If the pattern is based on A and the five positions in the consonant column include stars, then the pattern is for the vowel A. However, if the pattern is based on A and the consonant column includes only one indicium, then the pattern is for one of the consonants B, C or D depending on the position, as described below.

Figure 2:
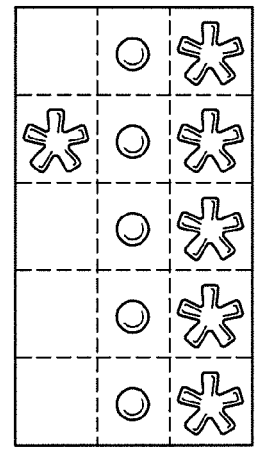
FIG. 2 is a plan view of one embodiment of a cell of the present invention including the raised projections in the second column, a first raised indicium of a particular shape populating a position in the first column, and the first raised indicium populating a plurality of positions in the third column, and associating those particular cell positions with a distinct letter of the alphabet—in this example the vowel E, in accordance with an aspect of the present invention.
Figure 3:
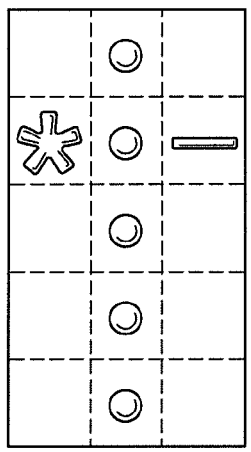
FIG. 3 is a plan view of one embodiment of a cell of the present invention including the raised projections in the second column, the first raised indicium populating a position in the first column and a second raised indicium of a particular shape populating a position in the third column, and associating those particular cell positions with a distinct letter of the alphabet—in this example the consonant G, in accordance with an aspect of the present invention.
Figure 4:
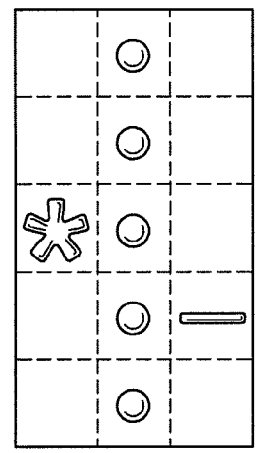
FIG. 4 is a plan view of one embodiment of a cell of the present invention including the raised projections in the second column, the first raised indicium populating a position in the first column, and the second raised indicium populating a position in the third column, and associating those particular cell positions with a distinct letter of the alphabet—in this example the consonant M, in accordance with an aspect of the present invention.

The Raised Indicia:

In one embodiment, the raised indicia include the following:

For Letters:

a) Stars are used in the first indicia column to represent vowels (see, e.g., FIGS. 2-4);

In this particular example, the first indicia column is also referred to as column 1; the orientation column is referred to as column 2; and the second indicia column is referred to a column 3, for ease of reference.

b) Stars are used in the second indicia column to indicate the second symbol whenever the cell is for a vowel. For example, in FIG. 2, a star in position 2, column 1 indicates the pattern of the cell is based on the letter E, and the stars in positions 1-5 of column 3 indicate the character is the letter E (as opposed to consonants based on the letter E: F, G, H);

c) Raised dots are used in the orientation column (column 2) as an aid to orientation (see, e.g., FIGS. 1-4); and d) Dashes (or horizontal lines) are used in the second indicia column to represent consonants (see, e.g., FIGS. 3 and 4). For example, in FIG. 3, a star in position 2, column 1 indicates the pattern of the cell is based on the letter E, and the dash in position 2, column 3 indicates the character is the letter G. The other positions in column 3 are left blank.

Figure 5:
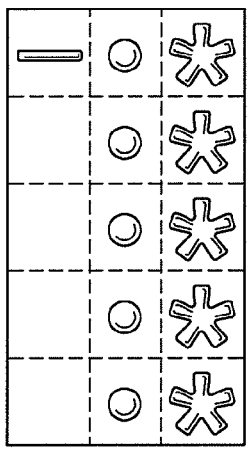
FIG. 5 is a plan view of one embodiment of a cell of the present invention including the raised projections in the second column, a third raised indicium of a particular shape populating a position in the first column and a fourth raised indicium of a particular shape populating a plurality of positions in the third column, and associating those particular cell positions with a distinct numeral—in this example the number zero, in accordance with an aspect of the present invention.
Figure 6:
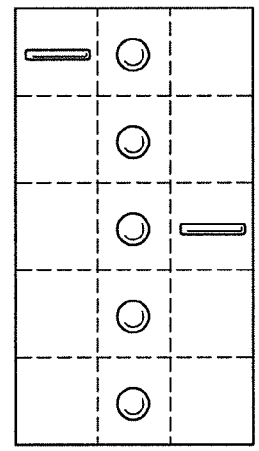
FIG. 6 is a plan view of one embodiment of a cell of the present invention including the raised projections in the second column, the third raised indicium populating a position in the first column and the third raised indicium populating a position in the third column, and associating those particular cell positions with a distinct numeral—in this example the numeral 3, in accordance with an aspect of the present invention.

For Numerals:

a) Dashes (or horizontal lines) in the first indicia column are used to indicate -0- in the first row or 5 in the second row (see, e.g., FIGS. 5 and 6 for patterns based on the numeral 0). 0 and 5 are also referred to herein as lead characters, since each numeral is the first in a subset of numerals based on that numeral; e.g., (0, 1, 2, 3, 4); and (5, 6, 7, 8, 9);

In this particular example, the first indicia column is also referred to as column 1; the orientation column is referred to as column 2; and the second indicia column is referred to a column 3, for ease of reference.

b) Stars in the second indicia column are used to indicate 0 or 5 as the second symbol whenever the 0 and 5 are intended. For example, in FIG. 5, a dash in position 1, column 1 indicates the pattern is based on the numeral 0, and the star in positions 1-5 of column 3 indicate the character is the numeral 0 (as opposed to numbers based on 0: 1, 2, 3, 4);

c) Raised dots are used in the orientation column as an aid to orientation (see, e.g., FIGS. 1 and 5-6); and d) Dashes (or horizontal lines) in the second indicia column (column 3 in this example) are used to indicate 1, 2, 3, 4, 6, 7, 8 or 9, depending on the position of the dash in the first indicia column. For example, in FIG. 6, a dash in position 1, column 1 indicates the pattern is based on the numeral 0, and a dash in position 3, column 3 indicates the character is the numeral 3. The other positions in column 3 are left blank.

Figure 7A:
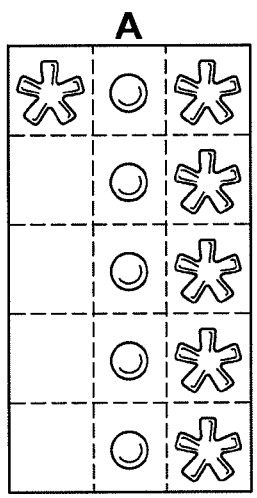
FIGS. 7A-7Z each depicts an example of a cell and indicia therein to represent each of the twenty-six letters of the alphabet, in accordance with an aspect of the present invention.

The Letters:

In accordance with an aspect of the present invention, a distinct letter of the alphabet, represented by a cell distinguishable to the touch, is indicated by the first indicia column (e.g., column 1) containing one raised indicium in one of the five first indicia column positions and the second indicia column (e.g., column 3) containing a raised indicium in one or more of the second indicia column positions. As depicted in FIGS. 7A-7Z, for cells uniquely representing letters, the first column indicium is, in one embodiment, a star. Also, in one embodiment, for cells uniquely representing letters that are vowels, the second indicia column raised indicium is a star in each of the five positions of that column. Further, in one embodiment, for cells uniquely representing a letter that is a consonant, the indicium appearing in one of the five positions in the second indicia column is a dash (or horizontal line).

The five proper vowels, A, E, I, O, U, are represented in the first indicia column by the presence or absence of a raised indicium in any of the rows. In one embodiment, the five vowels share the same raised symbol. For example, in one embodiment, for vowels of the alphabet, the symbol is a raised star.

Each vowel has a distinct physical location within the cell and more particularly in the first indicia column. As examples, the vowel A is represented by a raised star appearing in the first row of the first indicia column of the cell (FIG. 7A). The vowel E is represented by a raised star appearing in the second row of the first indicia column of the cell (FIG. 7E). The vowel I is represented by a raised star appearing in the third row of the first indicia column of the cell (FIG. 7I). The vowel O is represented by a raised star appearing in the fourth row of the first indicia column of the cell (FIG. 7O); and the vowel U is represented by a raised star appearing in the fifth row of the first indicia column of the cell (FIG. 7U). Each vowel is physically associated with the corresponding position in the cell. For each of the vowels, each position in the second indicia column (e.g., column 3) also includes, for instance, a raised star. This is to help distinguish the vowel from a consonant, as described herein.

The tactile indication to a user of cell position and corresponding vowel results, in one embodiment, from (1) touching the middle column raised dots (or running a finger or instrument from the top of the middle row down) to indicate each row of the cell; (2) the tactile presence of a first indicia column raised star in the same row as one of the middle column raised dots is tactile indication of one distinct position of the first indicia column; and (3) a distinct vowel in alphabetical order is associated with each of the rows in the first column. That is, a user discerns from touching the raised dots in the middle column that in the same row as one of the middle column raised dots there is also a raised star in the first indicia column. If the first indicia column raised star is in the same row as the first raised middle column dot, the first indicia column raised star represents the vowel A. If the first indicia column raised star is in the same row as the second middle column raised dot, the first indicia column raised star represents the vowel E. If the first indicia column raised star is in the same row as the third middle row raised dot, the first indicia column raised star represents the vowel I. If the first indicia column raised star is in the same row as the fourth middle row raised dot, the first indicia column raised star represents the vowel O. If the first indicia column raised star is in the same row as the fifth middle column raised dot, the first indicia column raised star represents the vowel U.

Each configuration of a star in a particular position in the first indicia column (e.g., column 1) together with an indicium in a particular position in the second indicia column (e.g., column 3) composes a cell pattern that is unique and corresponds to, for instance, a letter of the alphabet. Moreover, the sequence of patterns is closely related to the sequence of letters in the alphabet, thereby making the indicia in particular positions on the cell easy to associate with the alphabet to make the code, in accordance with an aspect of the invention, easy to memorize.

For example, a star (or other indicium) in the first indicia column (e.g., column 1) represents a vowel, the vowel depending on the position in the first indicia column. If there are also stars in all of the positions in the second indicia column (e.g., column 3), then a vowel is indicated. If, however, a dash (or other indicium) is in one of the positions in the second indicia column, and the other positions are blank then a consonant is indicated. The consonant depends on the vowel indicated by the star in the first indicia column and the position of the dash in the second indicia column.

As examples:

(In these examples, the first indicia column is column 1 and the second indicia column is column 3; however, this may be different for other examples.)

Figure 7B:
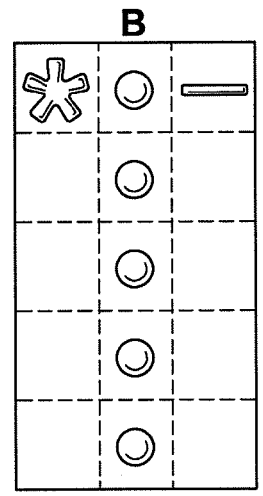
Figure 7C:
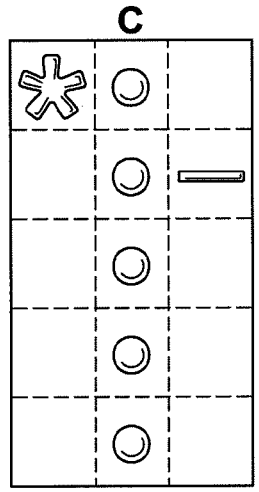
Figure 7D:
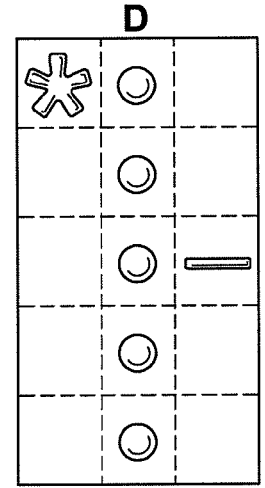
Figure 7E:
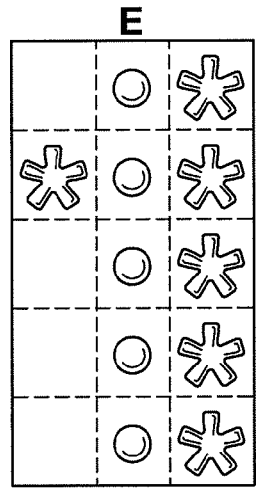
Figure 7F:
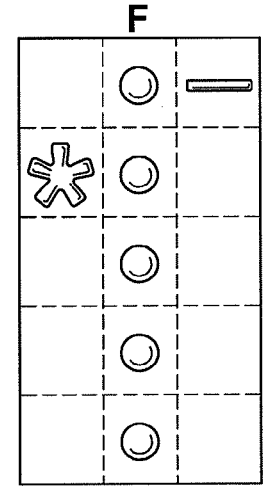
Figure 7G:
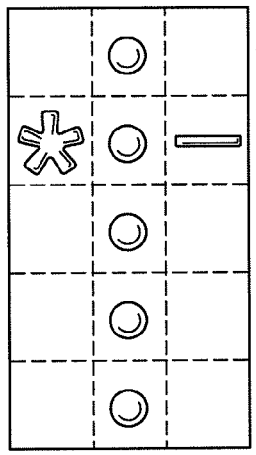
Figure 7H:
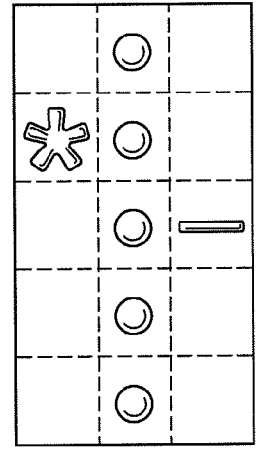
Figure 7I:
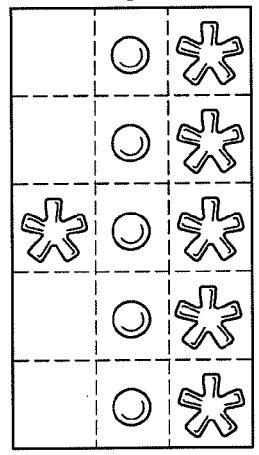
Figure 7J:
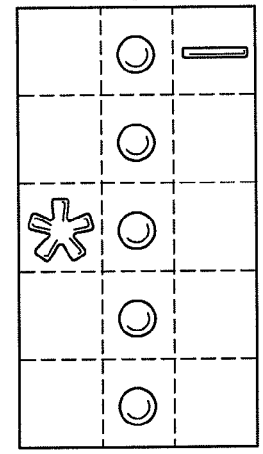
Figure 7K:
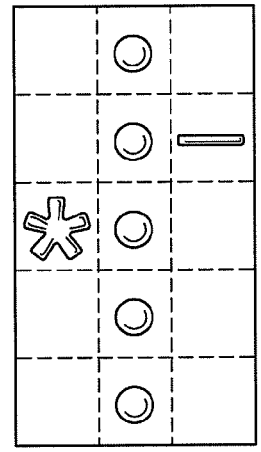
Figure 7L:
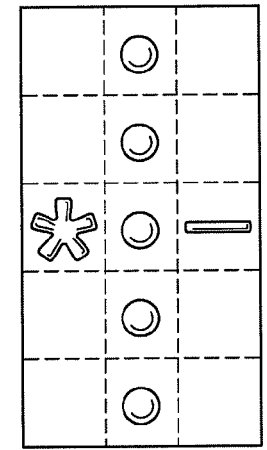
Figure 7M:
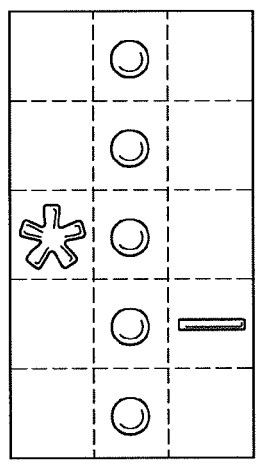
Figure 7N:
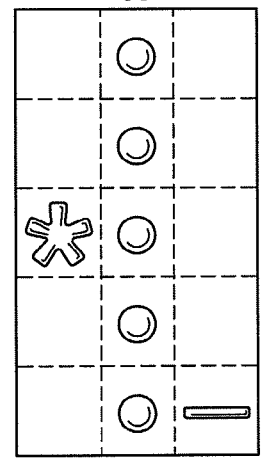
Figure 7O:
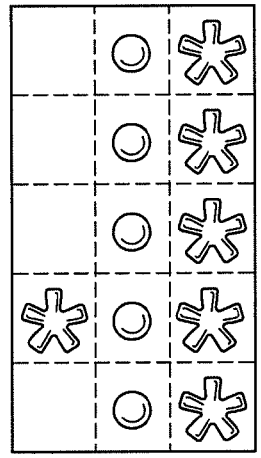
Figure 7P:
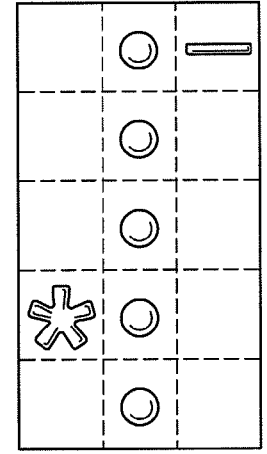
Figure 7Q:
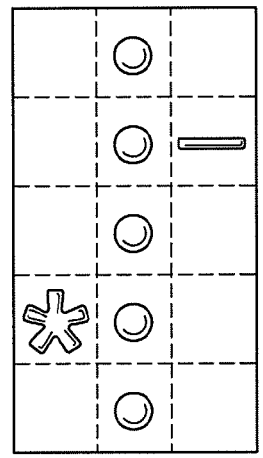
Figure 7R:
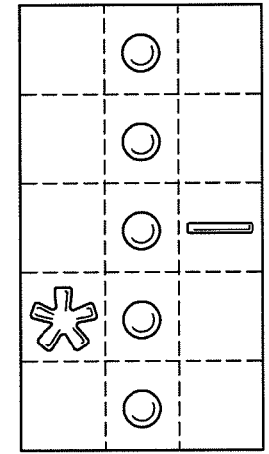
Figure 7S:
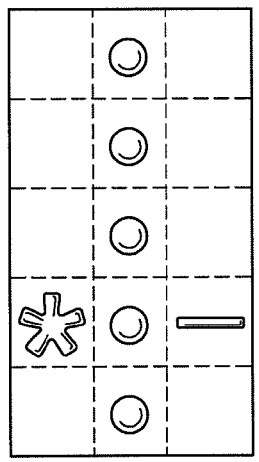
Figure 7T:
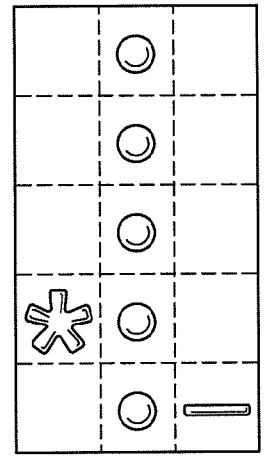
Figure 7U:
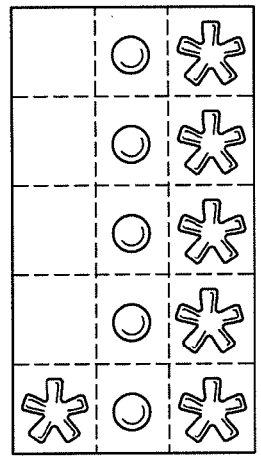
Figure 7V:
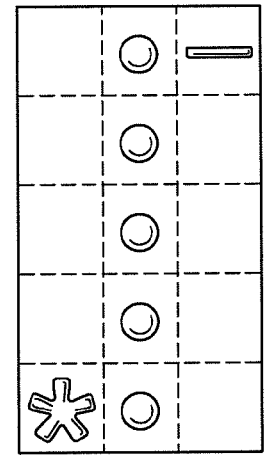
Figure 7W:
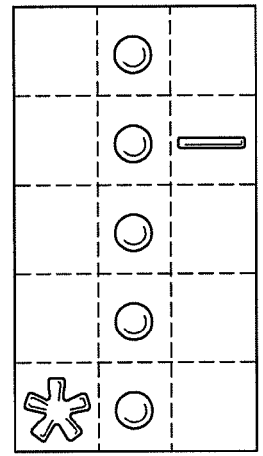
Figure 7X:
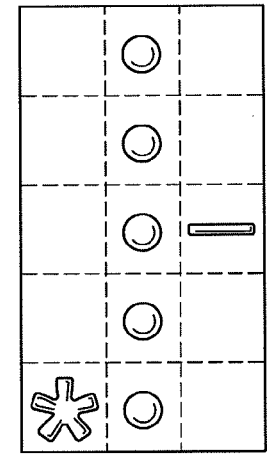
Figure 7Y:
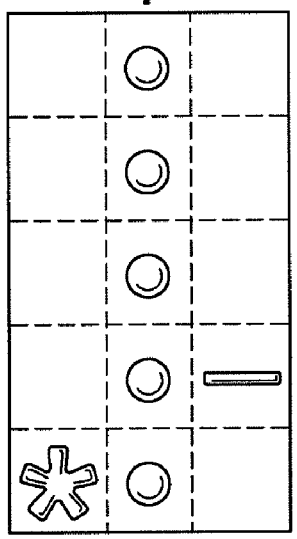
Figure 7Z:
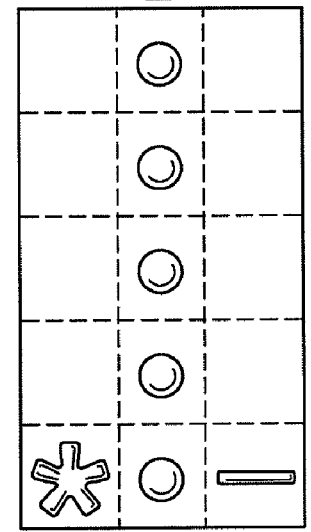

A star in the first position, column 1 and stars in the five positions of column 3, represents the vowel A (FIG. 7A);

A star in the first position, column 1 and a dash in the first position, column 3, represents the consonant B (FIG. 7B);

A star in the first position, column 1 and a dash in the second position, column 3, represents the consonant C (FIG. 7C);

A star in the first position, column 1 and a dash in the third position, column 3, represents the consonant D (FIG. 7D);

A star in the second position, column 1 and stars in the five positions of column 3, represents the vowel E (FIG. 7E);

A star in the second position, column 1 and a dash in the first position, column 3, represents the consonant F (FIG. 7F);

A star in the second position, column 1 and a dash in the second position, column 3, represents the consonant G (FIG. 7G);

A star in the second position, column 1 and a dash in the third position, column 3, represents the consonant H (FIG. 7H);

A star in the third position, column 1 and stars in the five positions of column 3, represents the vowel I (FIG. 7I);

A star in the third position, column 1 and a dash in the first position, column 3, represents the consonant J (FIG. 7J);

A star in the third position, column 1 and a dash in the second position, column 3, represents the consonant K (FIG. 7K);

A star in the third position, column 1 and a dash in the third position, column 3, represents the consonant L (FIG. 7L);

A star in the third position, column 1 and a dash in the fourth position, column 3, represents the consonant M (FIG. 7M);

A star in the third position, column 1 and a dash in the fifth position, column 3, represents the consonant N (FIG. 7N);

A star in the fourth position, column 1 and stars in all five positions of column 3, represents the vowel O (FIG. 7O);

A star in the fourth position, column 1 and a dash in the first position, column 3, represents the consonant P (FIG. 7P);

A star in the fourth position, column 1 and a dash in the second position, column 3, represents the consonant Q (FIG. 7Q);

A star in the fourth position, column 1 and a dash in the third position, column 3, represents the consonant R (FIG. 7R);

A star in the fourth position, column 1 and a dash in the fourth position, column 3, represents the consonant S (FIG. 7S);

A star in the fourth position, column 1 and a dash in the fifth position, column 3, represents the consonant T (FIG. 7T);

A star in the fifth position, column 1 and stars in the five positions of the column 3, represents the vowel U (FIG. 7U);

A star in the fifth position, column 1 and a dash in the first position, column 3, represents the consonant V (FIG. 7V);

A star in the fifth position, column 1 and a dash in the second position, column 3, represents the consonant W (FIG. 7W);

A star in the fifth position, column 1 and a dash in the third position, column 3, represents the consonant X (FIG. 7X);

A star in the fifth position, column 1 and a dash in the fourth position, column 3, represents the consonant Y (FIG. 7Y); and A star in the fifth position, column 1 and a dash in the fifth position, column 3, represents the consonant Z (FIG. 7Z).

Figure 8:
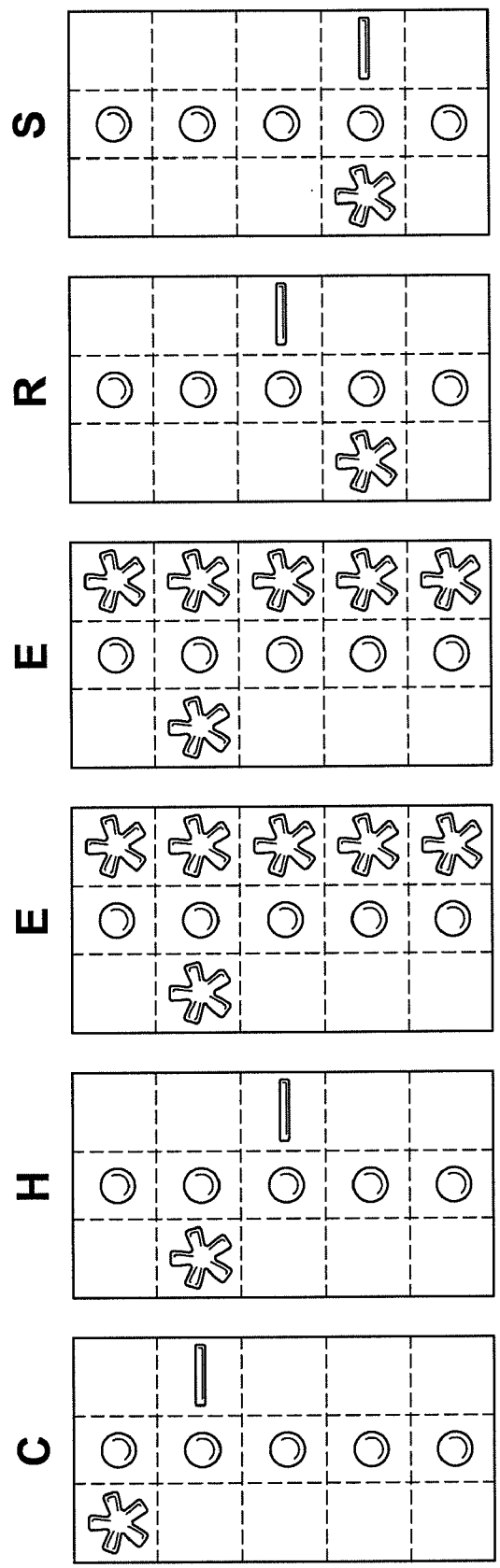
FIG. 8 depicts one example of a combination of cells that spell out the word "cheers," in accordance with an aspect of the present invention.

In one example, words are formed by using a plurality of cells. For example, the cells used, in one embodiment, to form the word CHEERS are depicted in FIG. 8.

Numerals:

In one embodiment for numerals, the indicium used in the first indicia column (e.g., column 1) is a dash and the indicium used in the second indicia column (e.g., column 3) for the lead numerals -0- and 5 is a star (see FIGS. 9A and 9F, respectively), and for other numerals, the indicium used in the second indicia column is a dash.

A distinct numeral, represented by a cell distinguishable to the touch is indicated by the first indicia column (e.g., column 1) containing one raised indicium in one of five first column positions and the second indicia (e.g., column 3) column containing one or more indicia in one or more of the second indicia column positions. As described with reference to FIGS. 9A-9J, for cells uniquely representing the numerals, the first indicia column indicium is, in one embodiment, a dash (or horizontal line), and for cells uniquely representing the numerals -0- and 5, the second indicia column raised indicium is a star in each of the five positions of the second indicia column (e.g., column 3). Further, for cells uniquely representing the numerals 1, 2, 3, 4, 6, 7, 8, and 9, the indicium appearing in one of the five positions in the second indicia column is a dash (or horizontal line).

For instance:

(In these examples, the first indicia column is column 1 and the second indicia column is column 3; however, this may be different for other examples.)

Figure 9A:
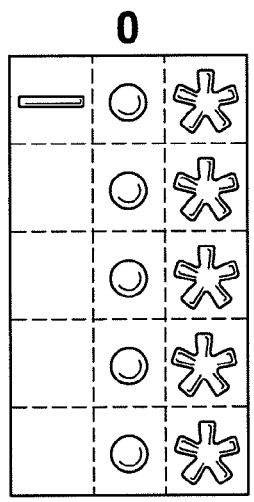
FIGS. 9A-9J each depicts an example of a cell and indicia therein to represent each of the numerals 0 through 9, in accordance with an aspect of the present invention.
Figure 9B:
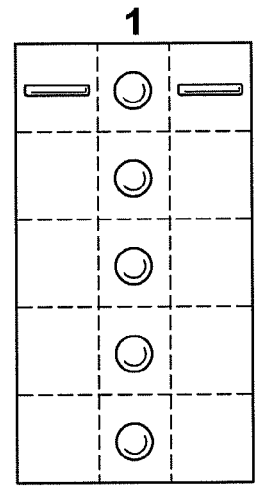
Figure 9C:
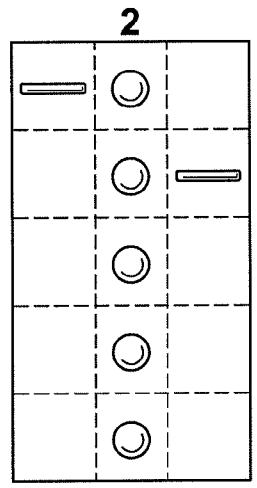
Figure 9D:
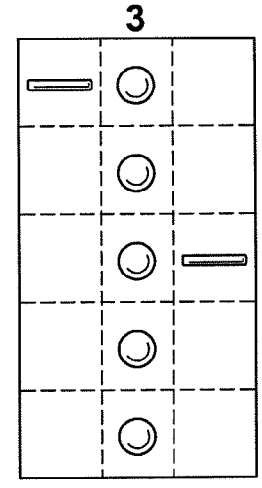
Figure 9E:
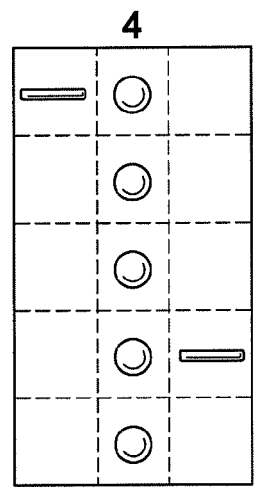
Figure 9F:
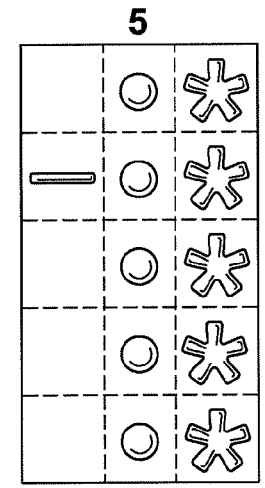
Figure 9G:
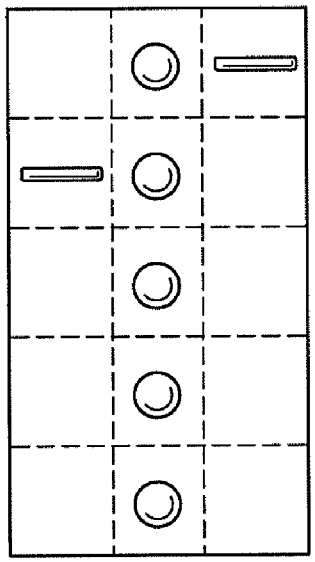
Figure 9H:
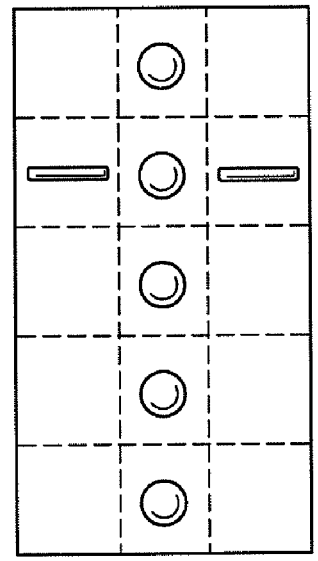
Figure 9I:
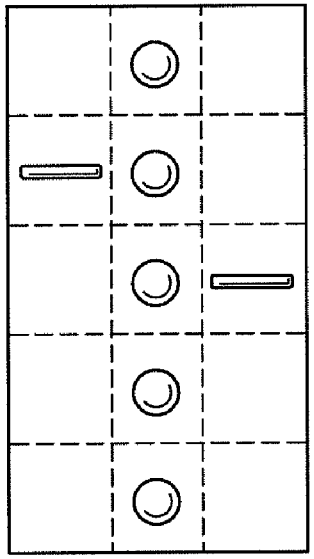
Figure 9J:
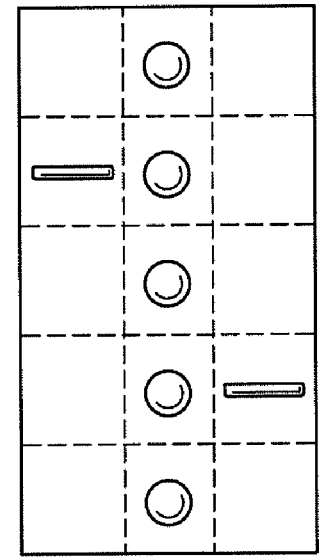

A dash in the first position, column 1 and a star in positions 1-5 of column 3 represents the number 0 (FIG. 9A);

A dash in the first position, column 1 and a dash in the first position, column 3 represents the number 1 (FIG. 9B);

A dash in the first position, column 1 and a dash in the second position, column 3 represents the number 2 (FIG. 9C);

A dash in the first position, column 1 and a dash in the third position, column 3 represents the number 3 (FIG. 9D);

A dash in the first position, column 1 and a dash in the fourth position, column 3 represents the number 4 (FIG. 9E);

A dash in the second position, column 1 and stars in positions 1-5 of the column 3 represents the number 5 (FIG. 9F);

A dash in the second position, column 1 and a dash in the first position, column 3 represents the number 6 (FIG. 9G);

A dash in the second position, column 1 and a dash in the second position, column 3 represents the number 7 (FIG. 9H);

A dash in the second position, column 1 and a dash in the third position, column 3 represents the number 8 (FIG. 9I); and A dash in the second position, column 1 and a dash in the fourth position, column 3 represents the number 9 (FIG. 9J).

Figure 10A:
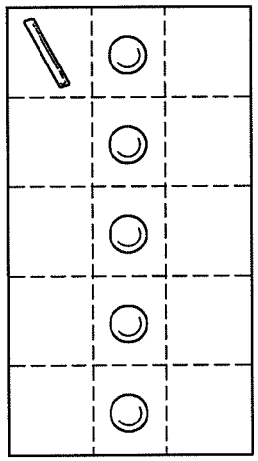
FIGS. 10A-10E each depicts an example of a cell and indicia therein to represent each of particular punctuation, in accordance with an aspect of the present invention.
Figure 10B:
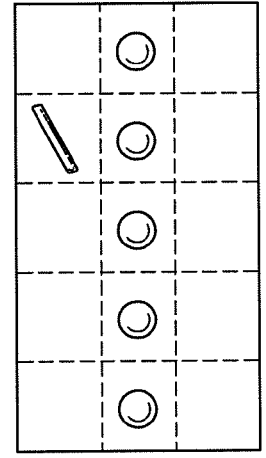
Figure 10C:
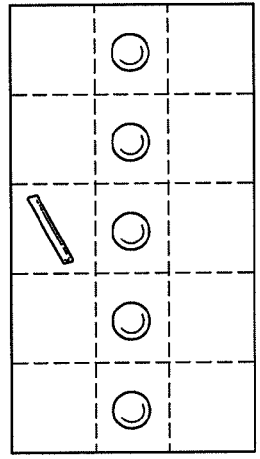
Figure 10D:
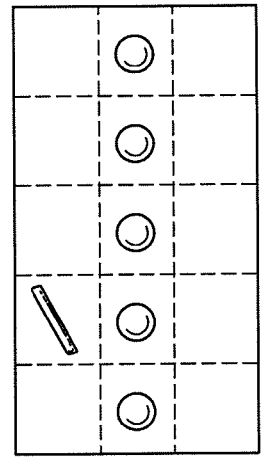
Figure 10E:
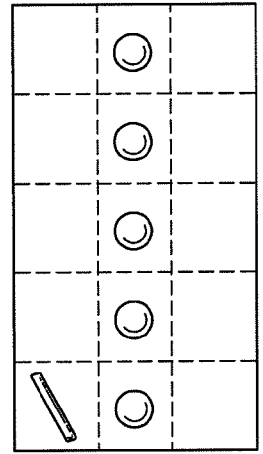

Symbols:

In accordance with an aspect of the present invention, other symbols are also indicated by raised indicia in the cells. As an example, a backward slash in the first position, first indicia column and no indicia in the second indicia column, represents a period (FIG. 10A); a backward slash in the second position, first indicia column and no indicia in the second indicia column, represents a comma (FIG. 10B); a backward slash in the third position, first indicia column and no indicia in the second indicia column, represents a question mark (FIG. 10C); a backward slash in the fourth position, first indicia column and no indicia in the second indicia column, represents an apostrophe (FIG. 10D); and a backward slash in the fifth position, first indicia column and no indicia in the second indicia column, represents an exclamation point (FIG. 10E).

Figure 11A:
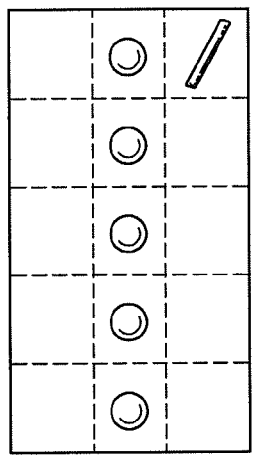
FIGS. 11A-11E each depicts an example of a cell and indicia therein to represent each of particular symbols, in accordance with an aspect of the present invention.
Figure 11B:
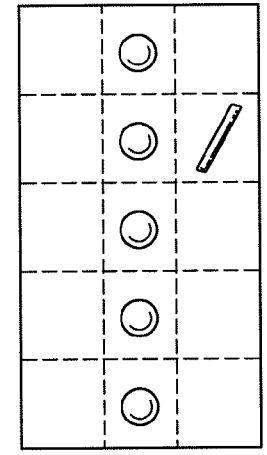
Figure 11C:
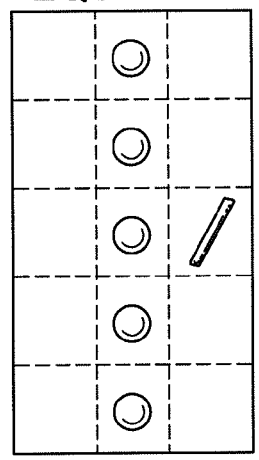
Figure 11D:
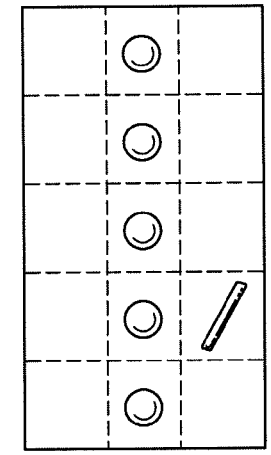
Figure 11E:
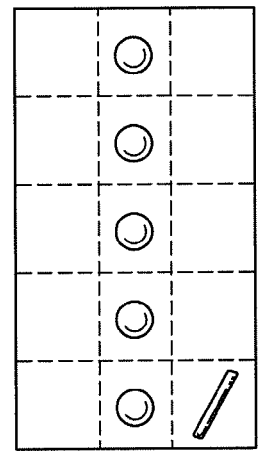

Also, as further examples:

No indicia in the first indicia column and a forward slash in the first position, second indicia column, represents a plus sign (FIG. 11A);

No indicia in the first indicia column and a forward slash in the second position, second indicia column, represents a minus sign (FIG. 11B);

No indicia in the first indicia column and a forward slash in the third position, second indicia column, represents an equal sign (FIG. 11C);

No indicia in the first indicia column and a forward slash in the fourth position, second indicia column, represents a percentage sign (FIG. 11D); and No indicia in the first indicia column and a forward slash in the fifth position, second indicia column, represents a dollar sign (FIG. 11E).

In different embodiments, cells can be configured to be read top/down, bottom/up, left to right and/or right to left. Many other examples are possible. Also, many types of indicia and/or projections may be used. Those described herein are only examples and are not meant to be limiting in any way. A column of a cell may have the same indicia/projections as one or more other columns; different indicia/projections in each column; or a mix of indicia/projections in the various columns. Again, although examples are shown herein, these examples are not meant to be limiting. Many possibilities are possible. For example, instead of stars in the last column to represent 0 or 5, dashes may be used. Further, lead characters may be represented in ways other than an indicia in all the positions of the second indicia column. Many other examples and variations exist without departing from the spirit of the present invention.

Another Embodiment

Figure 12A:
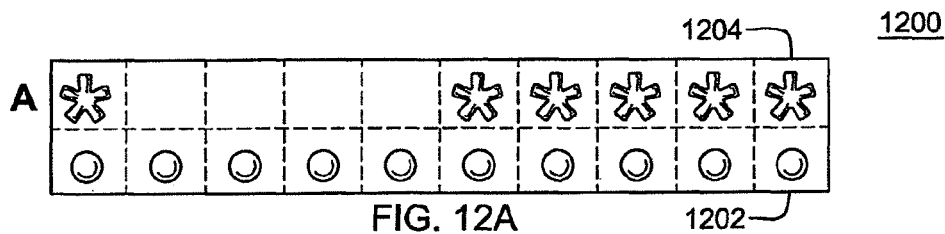
FIGS. 12A-12E each depicts another example of a cell with indicia therein to represent each vowel of the alphabet, in accordance with an aspect of the present invention.

In another embodiment of the invention, each cell has two rows of ten positions each. For example, as shown with reference to FIG. 12A, a cell 1200 has a row 1202 with 10, raised projections. This row, which is the last row in this example, but can be the first row in another example, is used for orientation. The other row, row 1204, referred to herein as row 1, is used to represent the characters and has one or more indicia therein. In one example, row 1204 has two regions: a first region (e.g., positions 1-5 of that row) to represent, for instance, the lead characters (e.g., vowels; 0; 5); and a second region (e.g., positions 6-10 of that row) to provide a unique character.

Figure 12B:
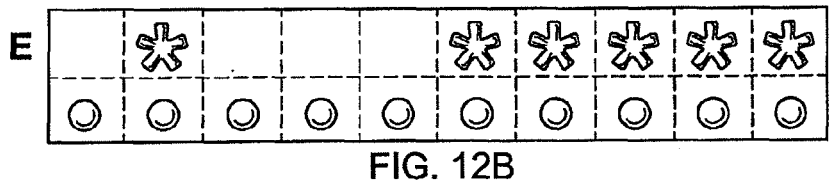
Figure 12C:
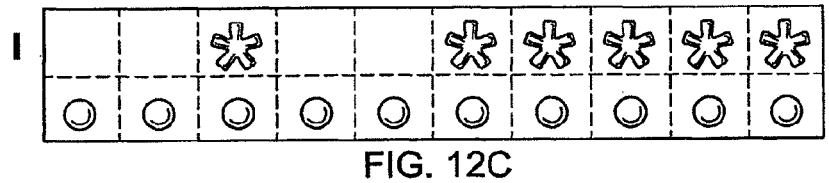
Figure 12D:
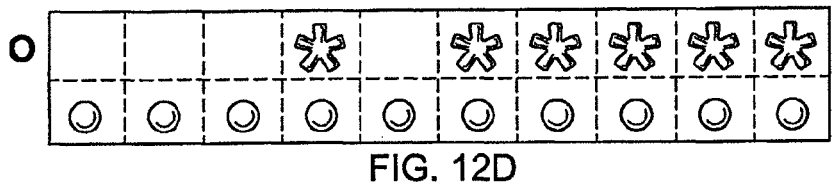
Figure 12E:
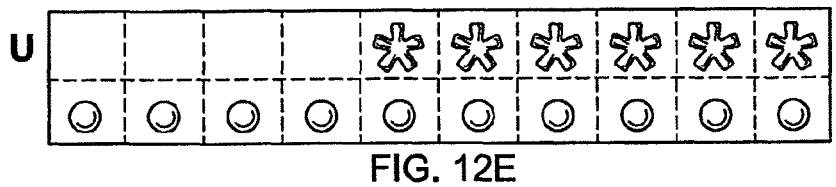

As specific examples, vowel A is indicated by an indicium, e.g., a star, in position 1, row 1, and stars (or other indicia) in positions 6-10 of row 1 (FIG. 12A); vowel E is indicated by a star, in position 2, row 1, and stars in positions 6-10 of row 1 (FIG. 12B); vowel I is indicated by a star, in position 3, row 1, and stars in positions 6-10 of row 1 (FIG. 12C); vowel O is indicated by a star, in position 4, row 1, and stars in positions 6-10 of row 1 (FIG. 12D); and vowel U is indicated by a star, in position 5, row 1, and stars in positions 6-10 of row 1 (FIG. 12E).

Figure 12F:
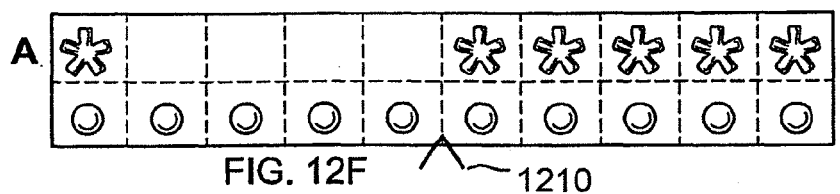
FIG. 12F is another embodiment of a cell with indicia therein to represent the vowel A, in accordance with an aspect of the present invention.

In one particular example, region 1 and region 2 are delineated by a raised projection 1210 (FIG. 12F) indicating a separation from positions 1-5 and 6-10.

Continuing with the examples, for the consonants, a star (or other indicium) is in the particular position in row 1 representing the vowel preceding the consonant, and another indicium (e.g., !) is in one of the positions 6-10 of row 1, depending on the consonant. This is depicted further in FIGS. 13A-13Z, which depict the cells for A-Z.

Figure 13A:
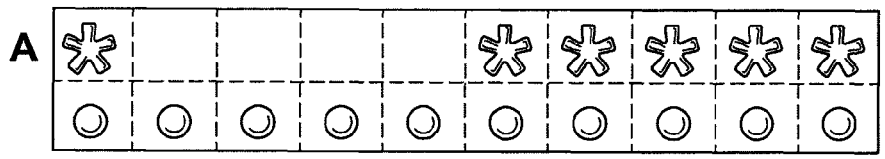
FIGS. 13A-13Z each depicts another example of a cell with indicia therein to represent each of the twenty-six letters of the alphabet, in accordance with an aspect of the present invention.
Figure 13B:
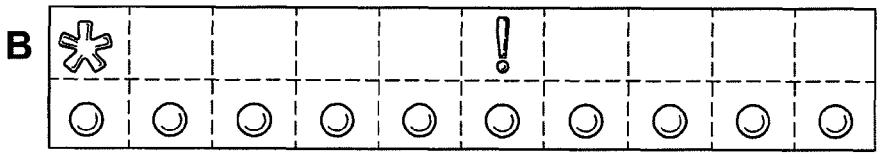
Figure 13C:
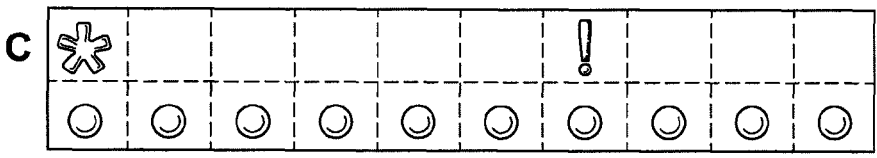
Figure 13D:
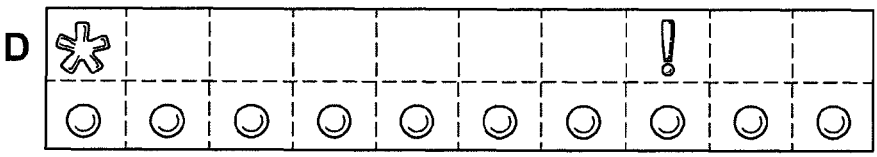
Figure 13E:
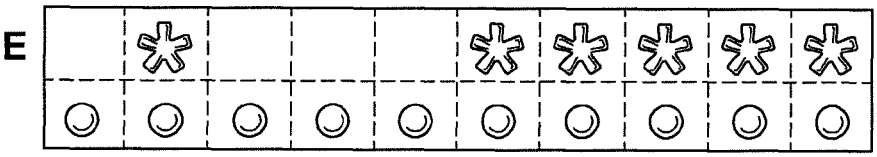
Figure 13F:
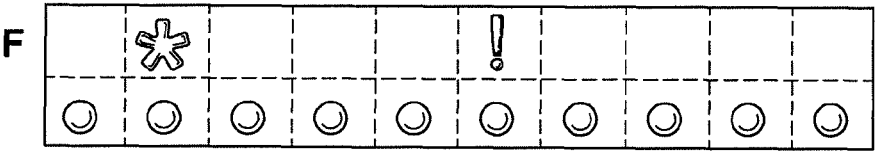
Figure 13G:
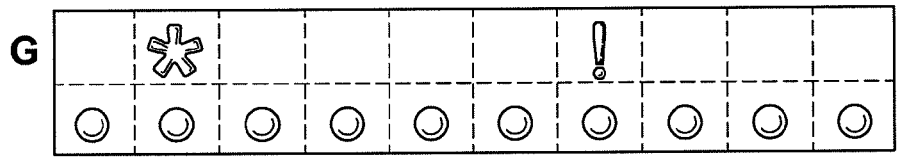
Figure 13H:
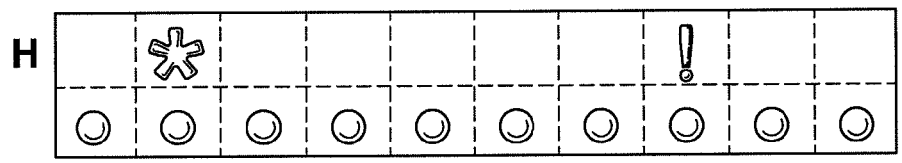
Figure 13I:
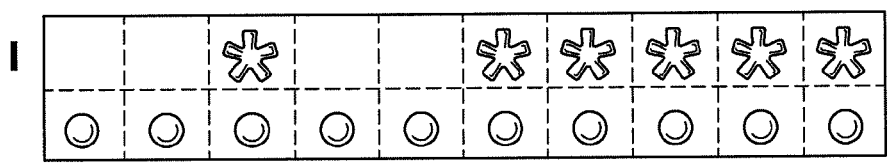
Figure 13J:
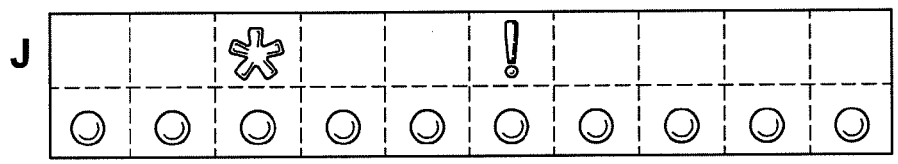
Figure 13K:
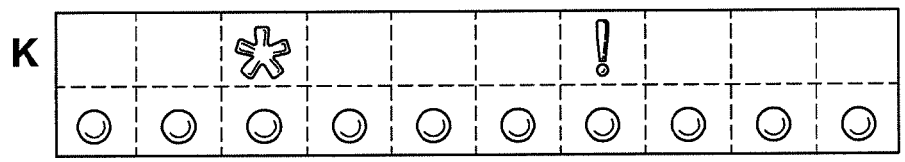
Figure 13L:
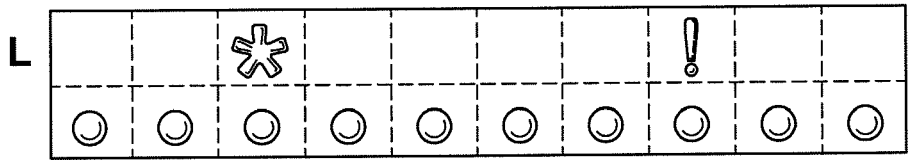
Figure 13M:
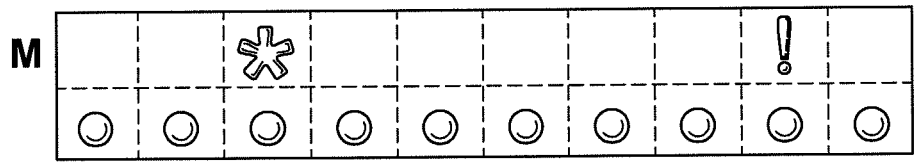
Figure 13N:
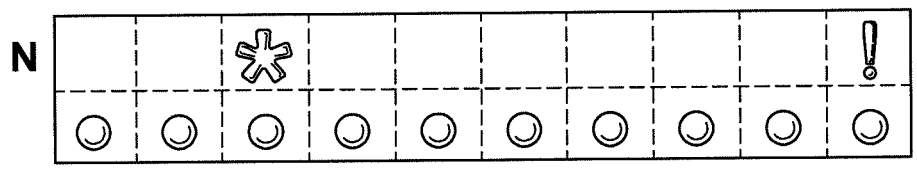
Figure 13O:
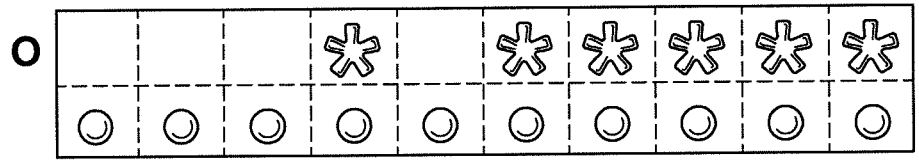
Figure 13P:
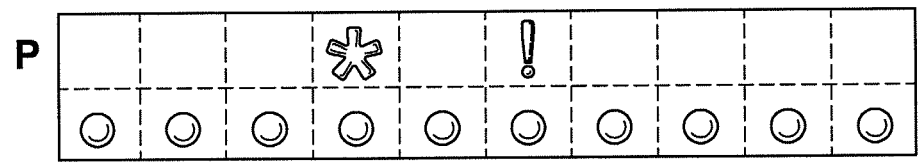
Figure 13Q:
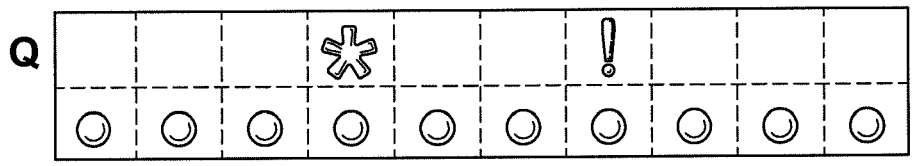
Figure 13R:
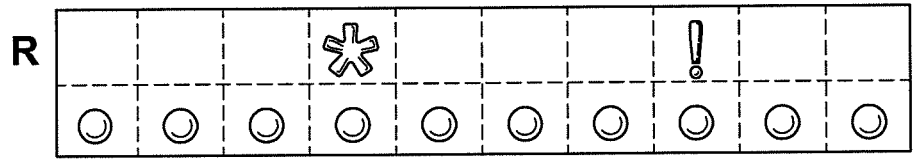
Figure 13S:
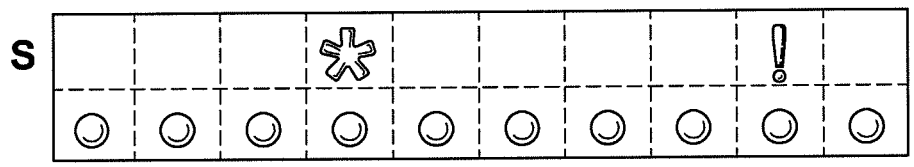
Figure 13T:
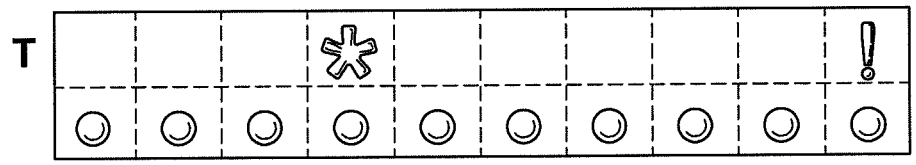
Figure 13U:
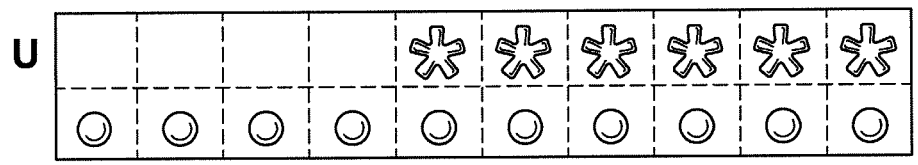
Figure 13V:
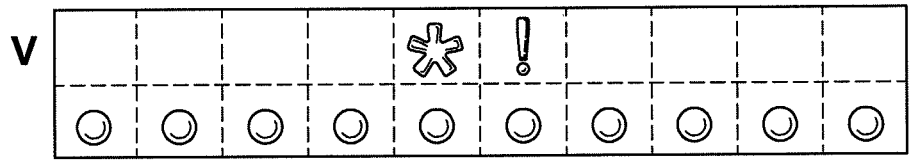
Figure 13W:
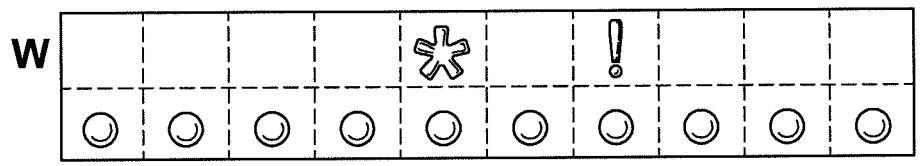
Figure 13X:
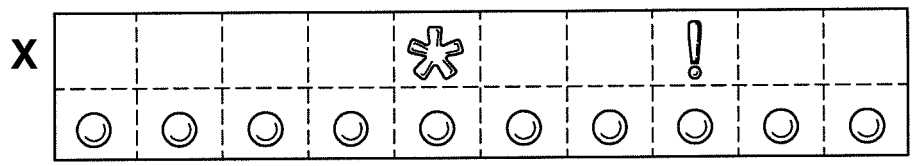
Figure 13Y:
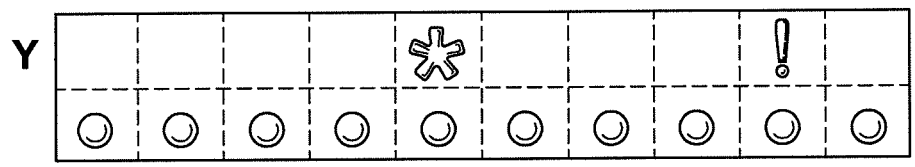

As shown:

For A: Star in position 1 of row 1, stars in positions 6-10 of row 1 (FIG. 13A);

For B: Star in position 1 of row 1, ! in position 6 of row 1 (FIG. 13B);

For C: Star in position 1 of row 1, ! in position 7 of row 1 (FIG. 13C);

For D: Star in position 1 of row 1, ! in position 8 of row 1 (FIG. 13D);

For E: Star in position 2 of row 1, stars in positions 6-10 of row 1 (FIG. 13E);

For F: Star in position 2 of row 1, ! in position 6 of row 1 (FIG. 13F);

For G: Star in position 2 of row 1, ! in position 7 of row 1 (FIG. 13G);

For H: Star in position 2 of row 1, ! in position 8 of row 1 (FIG. 13H);

For I: Star in position 3 of row 1, stars in positions 6-10 of row 1 (FIG. 13I);

For J: Star in position 3 of row 1, ! in position 6 of row 1 (FIG. 13J);

For K: Star in position 3 of row 1, ! in position 7 of row 1 (FIG. 13K);

For L: Star in position 3 of row 1, ! in position 8 of row 1 (FIG. 13L);

For M: Star in position 3 of row 1, ! in position 9 of row 1 (FIG. 13M);

For N: Star in position 3 of row 1, ! in position 10 of row 1 (FIG. 13N);

For O: Star in position 4 of row 1, stars in positions 6-10 of row 1 (FIG. 13O);

For P: Star in position 4 of row 1, ! in position 6 of row 1 (FIG. 13P);

For Q: Star in position 4 of row 1, ! in position 7 of row 1 (FIG. 13Q);

For R: Star in position 4 of row 1, ! in position 8 of row 1 (FIG. 13R);

For S: Star in position 4 of row 1, ! in position 9 of row 1 (FIG. 13S);

For T: Star in position 4 of row 1, ! in position 10 of row 1 (FIG. 13T);

For U: Star in position 5 of row 1, stars in positions 6-10 of row 1 (FIG. 13U);

For V: Star in position 5 of row 1, ! in position 6 of row 1 (FIG. 13V);

For W: Star in position 5 of row 1, ! in position 7 of row 1 (FIG. 13W);

For X: Star in position 5 of row 1, ! in position 8 of row 1 (FIG. 13X);

For Y: Star in position 5 of row 1, ! in position 9 of row 1 (FIG. 13Y); and

Figure 13Z:
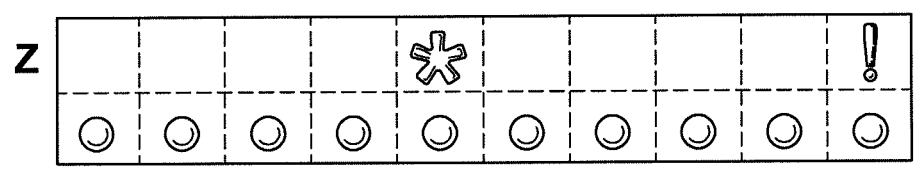

For Z: Star in position 5 of row 1, ! in position 10 of row 1 (FIG. 13Z).

Again, many other embodiments are possible, including, but not limited to, more or less rows than described herein, more or less columns, different indicia than used herein, different positioning of the indicia row or column, and even embodiments with no orientation column or row.

Figure 16:
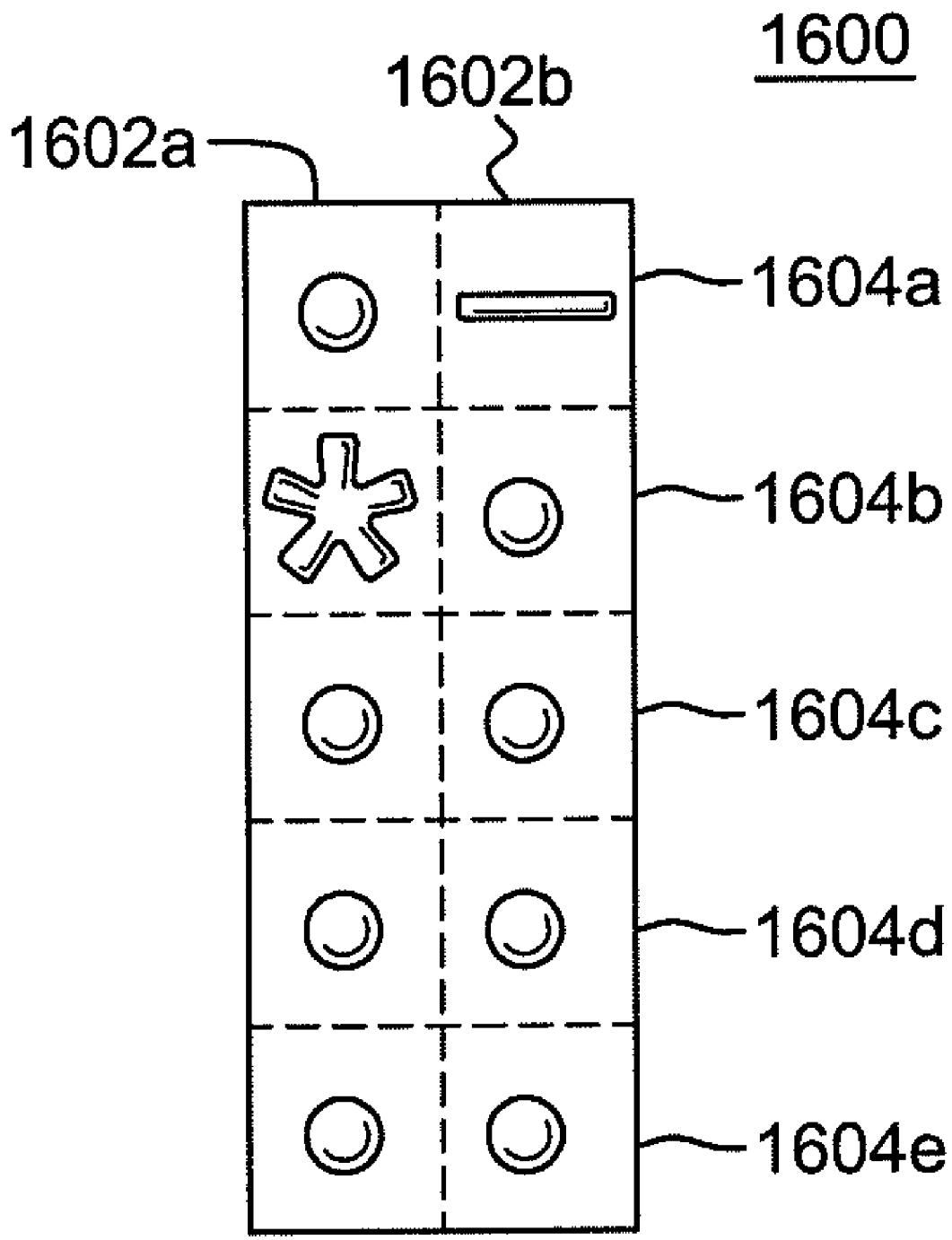
FIGS. 16, 17A-17C, 18A-18B and 19A-19E depict other examples of cell configurations, in accordance with aspects of the present invention.

One example of a cell 1600 with no orientation column or row is depicted in FIG. 16. In this particular embodiment, cell 1600 includes two columns, 1602A, 1602B, and five rows, 1604A-1604E. One of the columns, in this example, column 1602A, is the first indicia column (or first region) that represents the lead characters (e.g., the vowels of the alphabet; number 0 or 5 for numerals, etc.); and the other column, in this example, column 1602b, is the second indicia column (or second region). In this particular example, there is no orientation column, row or region. Instead, each position of each column has a raised indicium or projection. The projections (e.g., dots) help provide positioning and the indicia indicate the character. By running a finger or instrument down the first column, the user discerns that there are five positions in the first column, since there are five projections/indicia. In particular, the user discerns that there is a dot in the first position, column 1; a star in the second position, column 1, and dots in the remaining positions. By discerning a star in the second position, the user understands that the position represents the vowel E of the alphabet. That is, in this example, column 1, position 1 indicates A; column 1, position 2, represents E; column 1, position 3, represents I; column 1, position 4, represents O; and column 1, position 5, represents U.

If this cell in FIG. 16 was to represent the vowel E, then the five positions in column 1602B would be stars. However, in this example, the first position in column 2 includes a dash, and therefore, the user discerns that this cell represents the letter F. Similar cells may be created for the other letters of the alphabet, numerals or other symbols, as described above with FIGS. 1-6; 7A-7Z; 9A-9J; 10A-10D; and 11A-11E. The difference between this embodiment and the examples of those figures is that the central or middle column is removed, and instead of blanks in some of the positions of the first and second indicia columns, a particular projection (e.g., a raised dot) is used as a place holder.

Figure 17A:
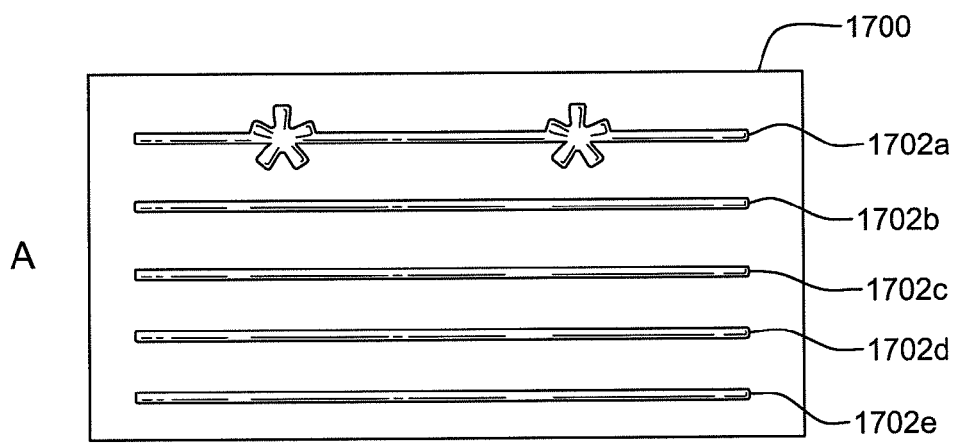
Figure 17B:
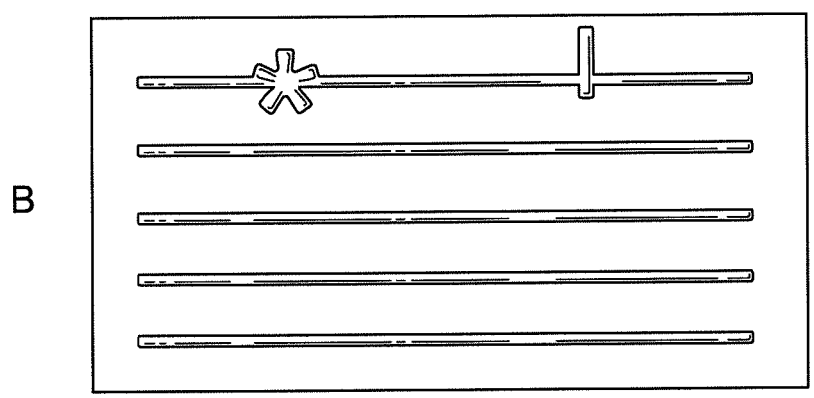
Figure 17C:
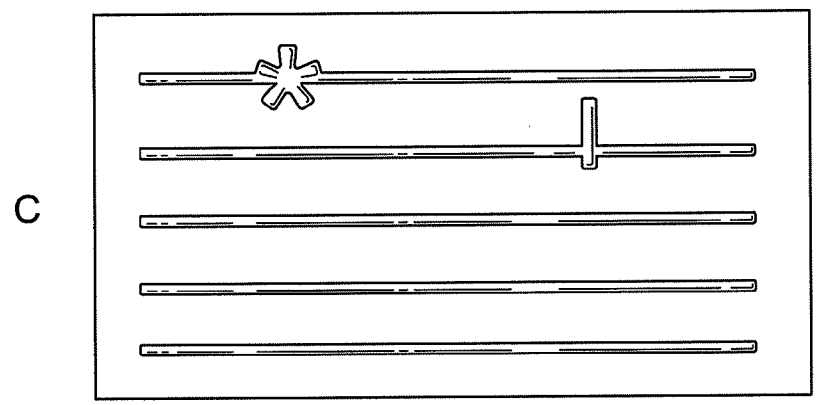

In yet a further embodiment, a cell 1700 (FIG. 17A) includes five tactily perceptible lines 1702*a*-1702*e*. Each of the lines represents a vowel A, E, I, O, U. For each line, there is an imaginary line down the middle dividing the line into two equal halves. Thus, in this example, a first region includes the left half of lines 1702*a*-1702*e*; and a second region includes the right half of lines 1702*a*-1702*e*. Region 1 is used to indicate, for instance, lead characters, and region 2 is used to indicate, for instance, the unique character. If the indicium on the right is the same as the indicium on the left on the same line, then a vowel (or the number 0 or 5) is indicated. Since the lines can be perceived by running a finger over them, there is no need for a third region to identify the positions. As examples, the letter A is depicted in FIG. 17A; the letter B is depicted in FIG. 17B; and the letter C is depicted in FIG. 17C.

Figure 18A:
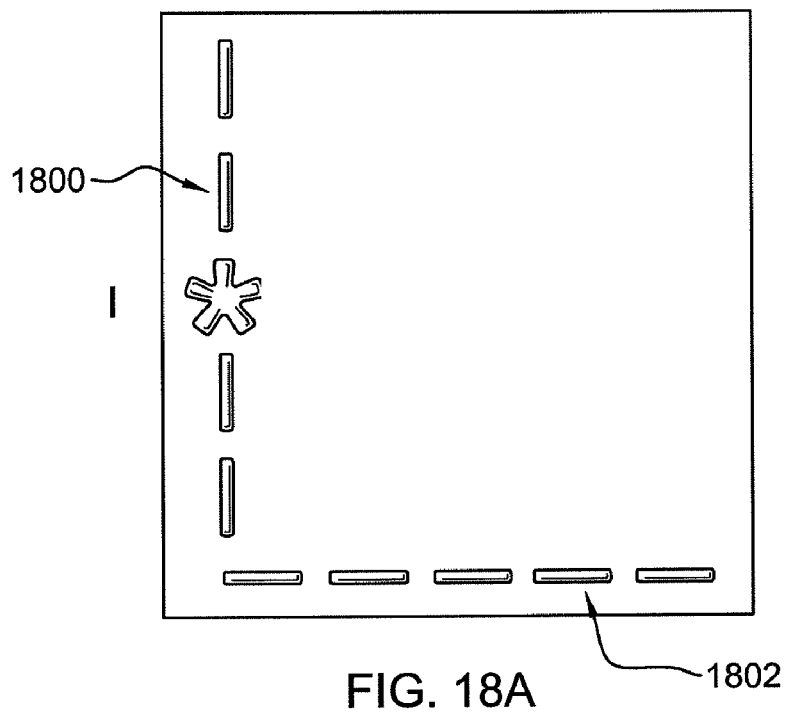
Figure 18B:
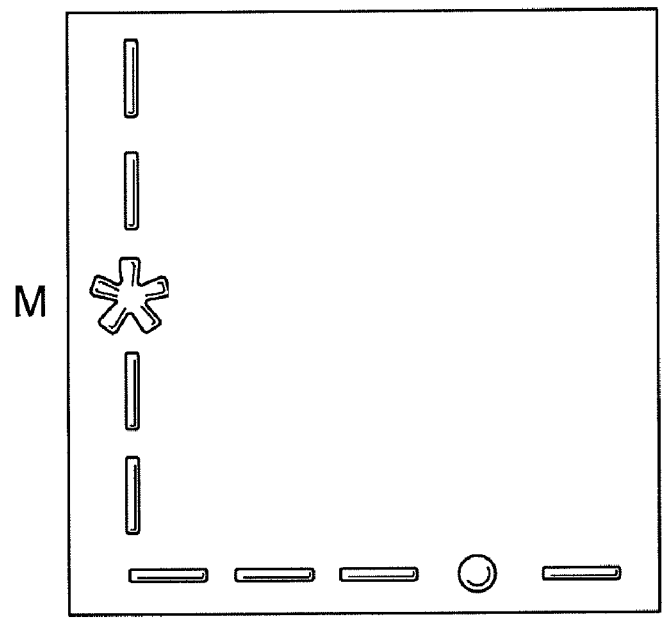

In yet a further embodiment, a perceptible vertical line 1800 with five positions for vowels is provided, as depicted in FIG. 18A. Also, a horizontal line 1802 is provided. Each position on both the vertical line and the horizontal line has an indicium/projection of a particular shape (e.g., star, bump, dot) to denote the position and/or character. If a vowel is intended, there is one indicium (e.g., star) on the vertical line in one position; and four projections (e.g., vertical dashes) in four positions of the vertical line; and five projections (e.g., horizontal dashes) on the horizontal line. If a consonant is intended, there is one indicium on the vertical line, one indicium on the horizontal line, and the remaining positions are projections. For example, in FIG. 18A, the vowel I is indicated by an indicium in the third position on the vertical line; projections in positions 1-2 and 4-5 of the vertical line; and projections in positions 1-5 of the horizontal line. Further, in FIG. 18B, the letter M is indicated by an indicium in the third position on the vertical line; projections in positions 1-2 and 4-6 of the vertical line; an indicium in the fourth position on the horizontal line; and projections in positions 1-3 and 5 of the horizontal line.

Figure 19A:
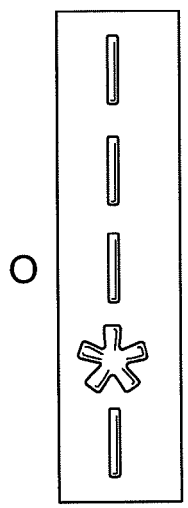
Figure 19B:
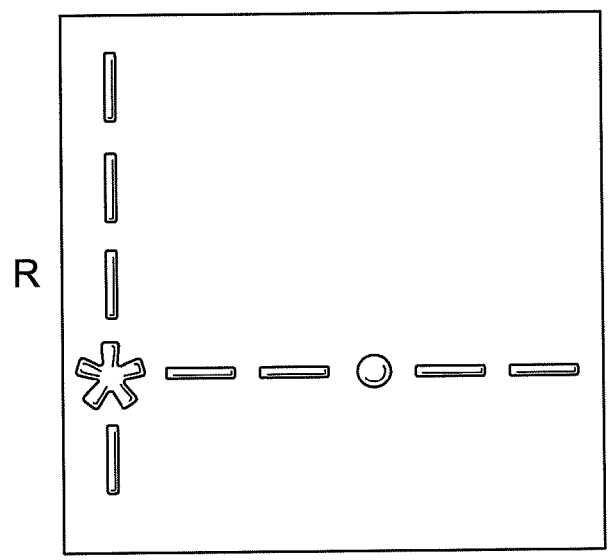
Figure 19C:
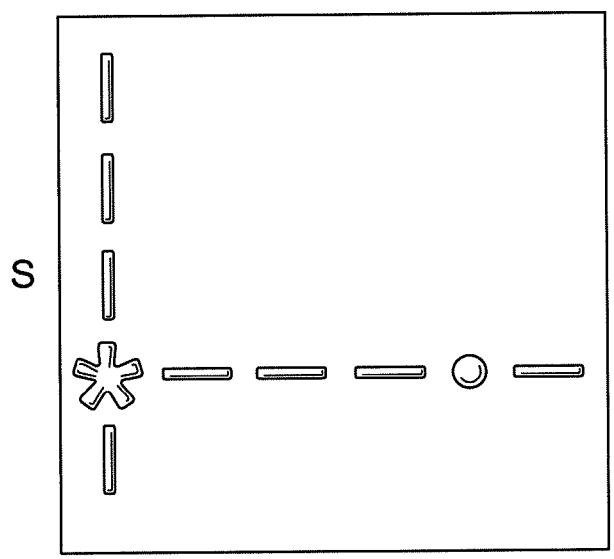
Figure 19D:
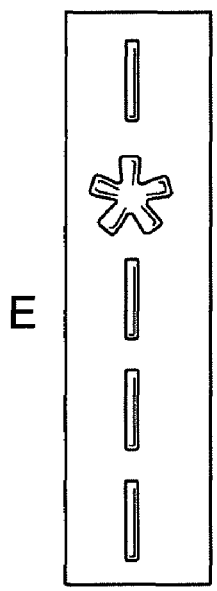
Figure 19E:
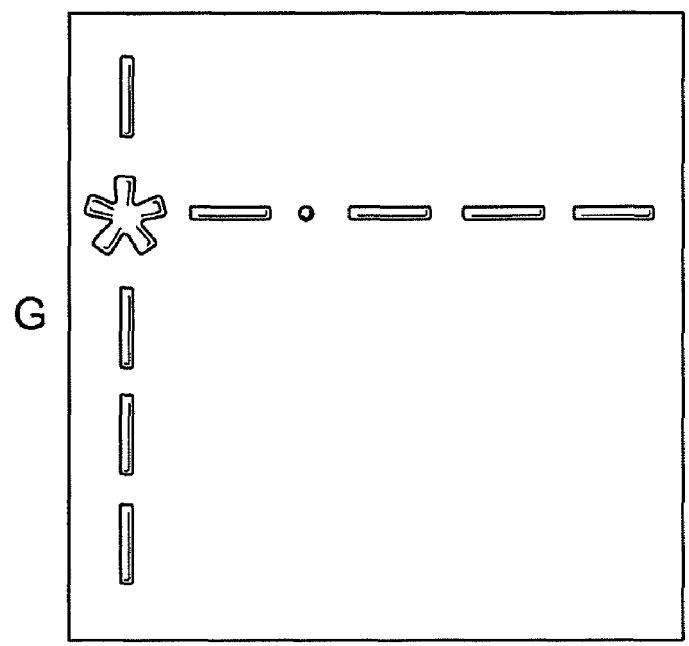

In yet a further embodiment, there is a vertical line with projections/indicium to indicate the five lead positions. For a vowel, there is an indicium (e.g., a star), instead of a projection (e.g., dot), as shown in FIG. 19A. For any consonant, there is also a horizontal line at the position of the vowel, which horizontal line has five projections to indicate five positions on the horizontal line. For example, in FIG. 19B, the indicium in the fourth position of the vertical line and the indicium in the third position on the horizontal line indicates the consonant R (the remaining positions have projections); similarly, in FIG. 19C, the indicium in the fourth position of the vertical line and the indicium in the fourth position of the horizontal line indicates the letter S; in FIG. 19D, the indicium in the second position of the vertical line, projections in positions 1 and 3-5 and no horizontal line, indicates the letter E; and in FIG. 19E, the indicium in the second position of the vertical line and an indicium in the second position of the horizontal line indicates the letter G.

Although the above examples are described and shown, there are many variations that are possible without departing from the spirit of the present invention. For example, although various indicia are used for the different columns and rows, many other variations may be used. The examples used herein are not to be limiting in any way. Further, there are many different cell variations, all of which are included in the scope of the claimed invention.

Keyboard for Visually Impaired Persons:

In accordance with a further aspect of the present invention, a keyboard is provided for use with a raised character or embossing device for embossing or otherwise providing raised surface cells and/or indicia/projections to form the characters of one aspect of the present invention. In particular, the keyboard is used to provide the indicia/projections to form the alphabet, numerals, punctuation and/or other symbols.

Figure 14A:
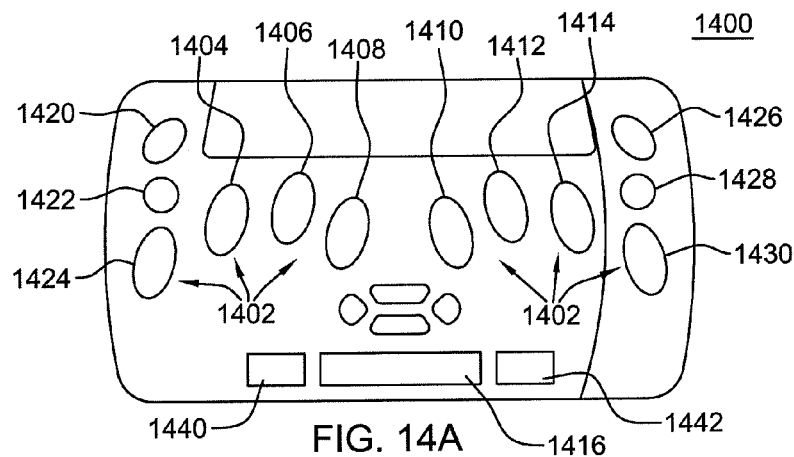
FIG. 14A is a view of one example of a keyboard for use with a typing or embossing apparatus to create raised indicia on a surface, in accordance with an aspect of the present invention.

Referring to FIG. 14A, in one embodiment, a keyboard 1400 includes a plurality of keys 1402, including six keys 1404-1414, for producing the content of the cells for tactile perception by touch described above in accordance with an aspect of the invention.

Keys 1404, 1406 and 1408 are grouped for the left hand, and keys 1410, 1412 and 1414 form a right-hand grouping to enable comfortable keystrokes with the fingers of the left hand and right hand, respectively. In one embodiment, users may choose to place the ring finger of the left hand on key 1404; the middle finger on key 1406 and the index finger on key 1408; as well as place the right hand index finger on key 1410, the middle finger on key 1412 and ring finger on key 1414. In one embodiment, the keys are arrayed to make it comfortable for users to enter keystrokes without needing to remove the fingers from the keyboard.

In this embodiment, key 1406 is associated with the vowel A; key 1408 is associated with the vowel E; key 1410 is associated with the vowel I; key 1412 is associated with the vowel O; and key 1414 is associated with the vowel U.

Key 1404 is a common key used to enter the vowels A, E, I, O and U. For instance, a keypress of a vowel key 1406-1414 followed by a keypress of common key 1404 enters the particular unique tactile perceptible cell for that particular vowel. Accordingly, the unique cell vowels are entered as follows:

| Vowel | First Keypress | Second Keypress | FIG. 7 Cells |
|-------|---------------|-----------------|--------------|
| A | 1406 | 1404 | A |
| E | 1408 | 1404 | E |
| I | 1410 | 1404 | I |
| O | 1412 | 1404 | O |
| U | 1414 | 1404 | U |

It will be noted that, in this example, the alphabetical order is retained and associated with the keys in the same order.

The keyboard of one aspect of the present invention also enables the simple entry of consonants utilizing the same keys. In one embodiment, a keypress of a vowel key followed by another keypress of a vowel key enters a consonant. Accordingly, the unique cells for each consonant are entered for production on a surface, as described below:

For the group of consonants immediately following the vowel A and preceding the vowel E, the consonants are entered as follows:

| Consonant | First Keypress | Second Keypress | FIG. 7 Cells |
|---|---|---|---|
| B | 1406 | 1406 | B |
| C | 1406 | 1408 | C |
| D | 1406 | 1410 | D |

For the group of consonants immediately following the vowel E and preceding the vowel I, the consonants are entered as follows:

| Consonant | First Keypress | Second Keypress | FIG. 7 Cells |
|---|---|---|---|
| F | 1408 | 1406 | F |
| G | 1408 | 1408 | G |
| H | 1408 | 1410 | H |

For the group of consonants immediately following the vowel I and preceding the vowel O, the consonants are entered as follows:

| Consonant | First Keypress | Second Keypress | FIG. 7 Cells |
|---|---|---|---|
| J | 1410 | 1406 | J |
| K | 1410 | 1408 | K |
| L | 1410 | 1410 | L |
| M | 1410 | 1412 | M |
| N | 1410 | 1414 | N |

For the group of consonants immediately following the vowel O and preceding the vowel U, the consonants are entered as follows:

| Consonant | First Keypress | Second Keypress | FIG. 7 Cells |
|---|---|---|---|
| P | 1412 | 1406 | P |
| Q | 1412 | 1408 | Q |
| R | 1412 | 1410 | R |
| S | 1412 | 1412 | S |
| T | 1412 | 1414 | T |

For the group of consonants immediately following the vowel U and including the last letter of the alphabet, the consonants are entered as follows:

| Consonant | First Keypress | Second Keypress | FIG. 7 Cells |
|---|---|---|---|
| V | 1414 | 1406 | V |
| W | 1414 | 1408 | W |
| X | 1414 | 1410 | X |
| Y | 1414 | 1412 | Y |
| Z | 1414 | 1414 | Z |

In further embodiments, other keys of the keyboard, including keys, 1416, 1420, 1422, 1424, 1426 and 1428 may be provided, which include, for instance, a space key 1416, a shift for capitals 1420, a key for entering numbers 1422, a key for entering symbols 1424, a key for entering punctuation 1426, and other useful keyboard keys 1430. Yet further, key 1440 is for selecting embossing or in some other fashion creating the raised cells; and key 1442 is to change the keyboard for usage with typing regular print on paper.

Figure 14B:
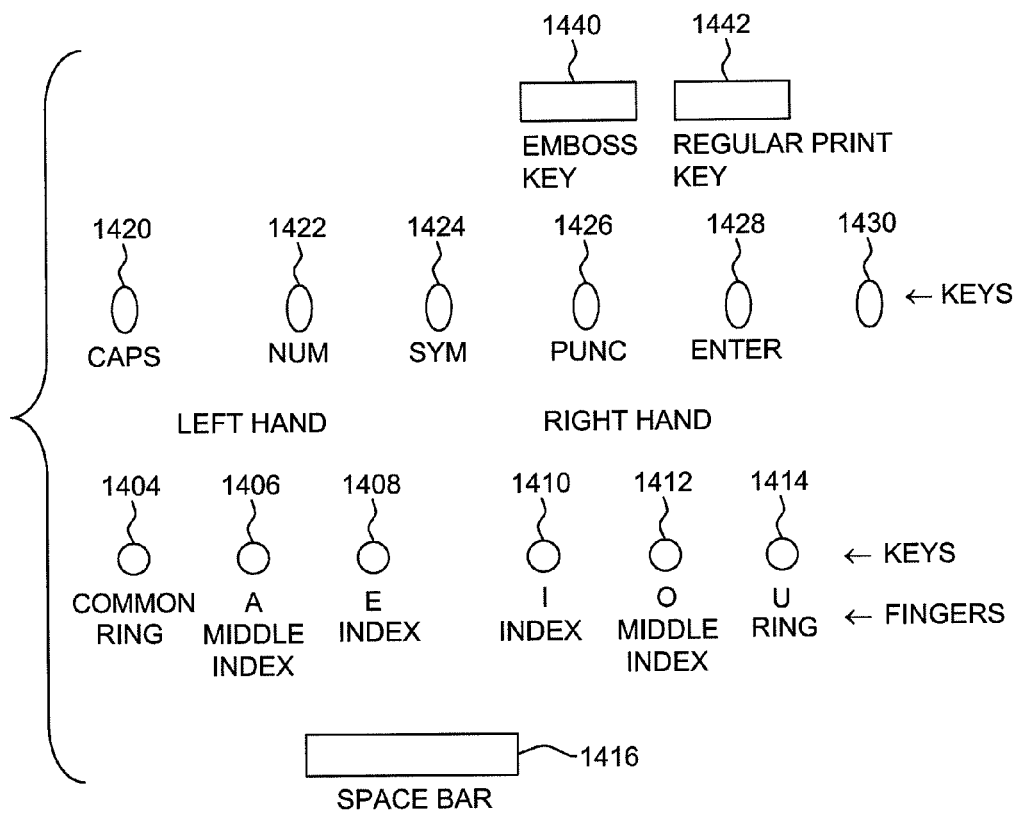
FIG. 14B depicts examples of keys of the keyboard of FIG. 14A used in accordance with an aspect of the present invention.

In another embodiment of the keyboard, the keyboard enables the simple entry of numerals utilizing the same keys. Referring to FIGS. 14A-14B, a user manually presses key 1422 to shift from letters of the alphabet to numerals. In one embodiment of this invention, key 1406 is associated with the numeral -0-, and key 1408 is associated with the numeral 5.

Key 1404 is the common key for the numerals -0- and 5. A keypress of either the numeral -0- or the numeral 5 followed by a keypress of the common key (1404) enters the particular unique tactile perceptible cell for that particular numeral. Accordingly, the unique cells for numbers are entered as follows:

| Numeral | First Keypress | Second Keypress | FIG. 9 Cells |
|---|---|---|---|
| 0 | 1406 | 1404 | -0- |
| 5 | 1408 | 1404 | 5 |

For the group of numerals immediately following the Numeral 0 and preceding the Numeral 5, the numerals are entered as follows:

| Numeral | First Keypress | Second Keypress | FIG. 9 Cells |
|---|---|---|---|
| 1 | 1406 | 1406 | 1 |
| 2 | 1406 | 1408 | 2 |
| 3 | 1406 | 1410 | 3 |
| 4 | 1406 | 1412 | 4 |

For the group of numerals immediately following the Numeral 5 and preceding the Numeral 10, the numerals are entered as follows:

| Numeral | First Keypress | Second Keypress | FIG. 9 Cells |
|---|---|---|---|
| 6 | 1408 | 1406 | 6 |
| 7 | 1408 | 1408 | 7 |
| 8 | 1408 | 1410 | 8 |
| 9 | 1408 | 1412 | 9 |

Figure 15A:
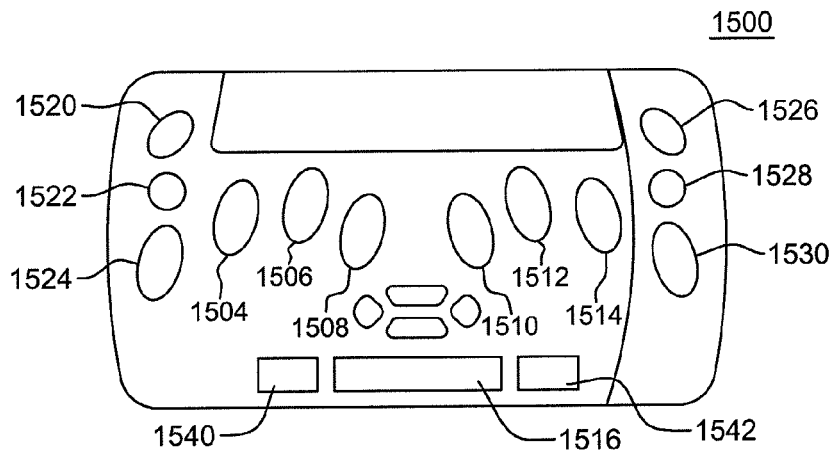
FIG. 15A depicts an example of a keyboard for use with a typing or embossing apparatus to create raised indicia on a surface, in accordance with an aspect of the present invention.
Figure 15B:
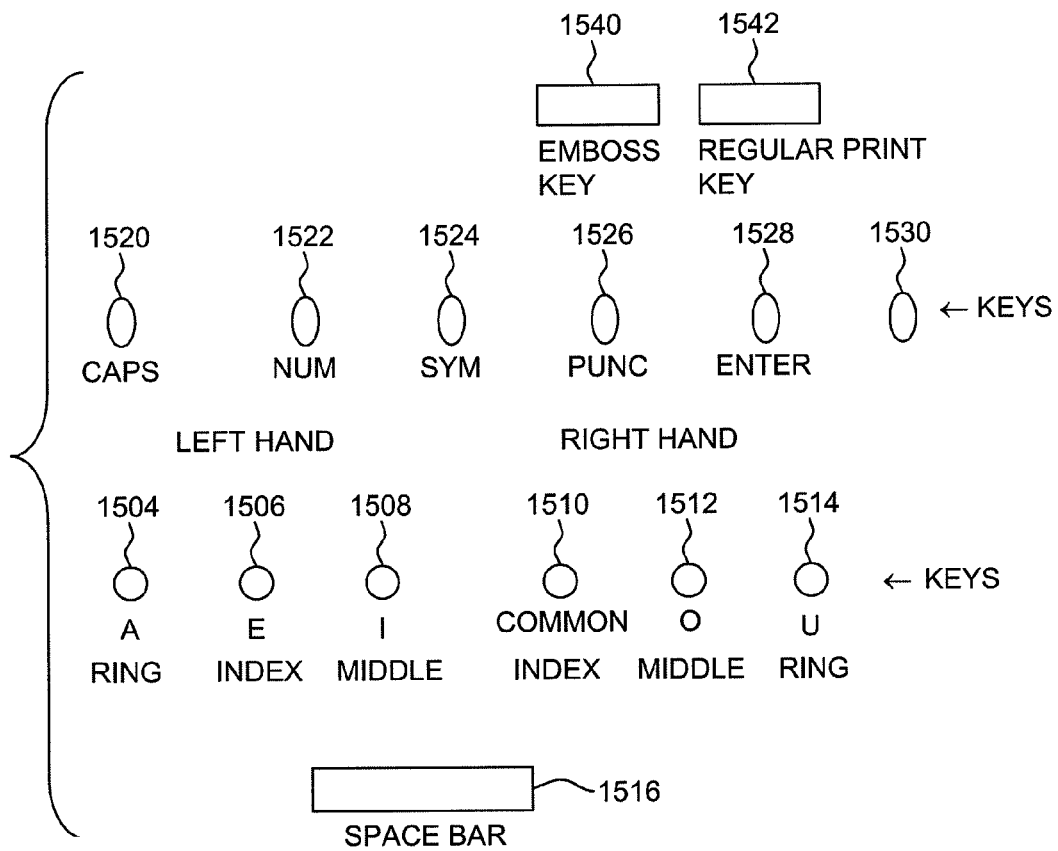
FIG. 15B depicts examples of keys of the keyboard of FIG. 15A used in accordance with an aspect of the present invention.

An alternative embodiment of the keyboard is described with reference to FIGS. 15A-15B. Referring to FIG. 15A, in this example, a keyboard 1500 includes a plurality of keys, including keys 1504-1514, space bar 1516, keys 1520-1530, and keys 1540-1542, which are similar to the keys described with reference to FIGS. 14A-14B. However, in this example, the common key is key 1510; the key representing the vowel A is key 1504; key 1506 represents the vowel E; key 1508 represents the vowel I; key 1512 represents the vowel O; and key 1514 represents the vowel U.

Many other keyboard variations are also possible and included within the scope of the claimed invention.

In one example, an article of manufacture (e.g., one or more computer program products) having, for instance, computer readable media includes one or more aspects of the present invention. The media has therein, for instance, computer readable program code means or logic (e.g., instructions, code, commands, etc.) to provide and facilitate the capabilities of the present invention, including, but not limited to, providing the tactile code, reproducing the tactile code, etc. The article of manufacture can be included as a part of a computer system or sold separately.

Figure 20:
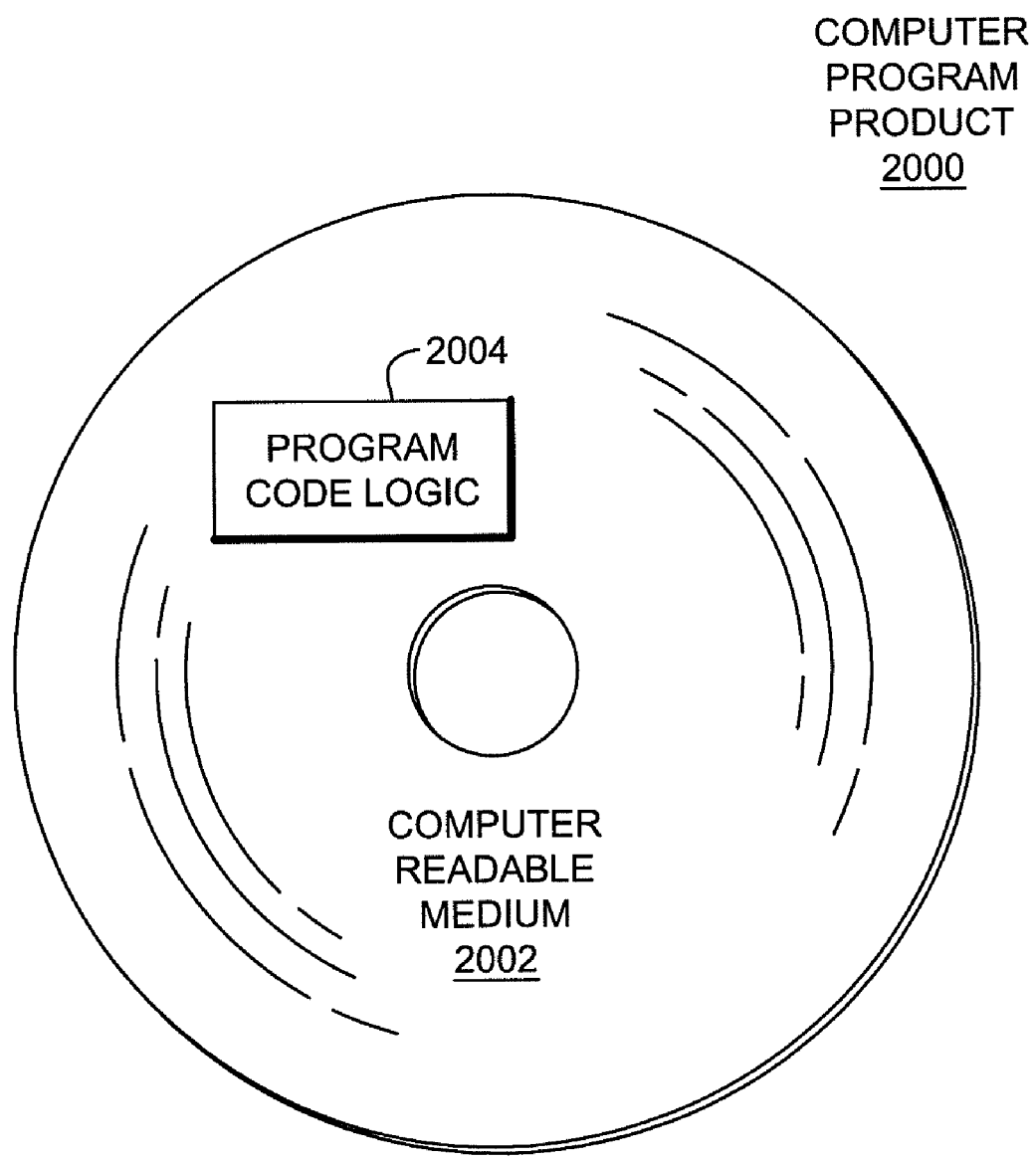
FIG. 20 depicts one embodiment of a computer program product incorporating one or more aspects of the present invention.

One example of an article of manufacture or a computer program product incorporating one or more aspects of the present invention is described with reference to FIG. 20. A computer program product 2000 includes, for instance, one or more computer readable media 2002 to store computer readable program code means or logic 2004 thereon to provide and facilitate one or more aspects of the present invention. The medium can be an electronic, magnetic, optical, electromagnetic, infrared, or semiconductor system (or apparatus or device), as examples. Examples of a computer readable medium include a semiconductor or solid state memory, magnetic tape, a removable computer diskette, a random access memory (RAM), a read-only memory (ROM), a rigid magnetic disk and an optical disk. Examples of optical disks include compact disk-read only memory (CD-ROM), compact disk-read/write (CD-R/W) and DVD.

Advantageously, a new, simplified and improved code system of tactile cells is provided to improve readability of tactile characters for blind and low vision users according to one or more aspects of the present invention. A code configured with raised indicia in patterns that represent letters of the alphabet, numbers, punctuation and symbols is provided that can be printed in books, magazines, packages and other such printed materials, as well as on plaques or other surfaces. A system is provided that assists in the learning and memorization of the configurations of each cell, and thereby, reduces the cognitive load associated with tactile alphabets.

A technique of tactile cells is provided on a surface that is configured to be readable by the touch of a finger, by visual reading, and also, in certain embodiments, can be machine read by a scanner as machine readable code.

A keyboard configured to improve input into an apparatus that produces tactile cells on surfaces is also provided.

In accordance with an aspect of the present invention, a tactile code is provided for letters and numbers that while not resembling the letters of the alphabet, does eliminate ambiguity to allow blind and visually impaired persons to pass a finger over the cell to easily discern the character and also improve speed and readability of tactile alphabets.

In a further aspect of this invention, the general familiarity of the public is melded with the proper sequence of the vowels and of the consonants that immediately follow each vowel in the alphabet with the distinct order of symbols in a cell.

Although specific examples are shown herein that pertain to the alphabet and numbers commonly used in the English language, one or more aspects of the present invention are applicable to other languages. Further, the use of uppercase letters is only for clarity; one or more aspects of the invention are applicable to both upper and lower case letters. Yet further, although cells are described, it is not necessary to provide the "box" around the patterns. In providing a character, only the pattern of the cell is created, in one or more aspects of the present invention.

The foregoing description of the present invention has been provided for the purposes of illustration and description. It is not intended to be exhaustive or to limit the invention to the precise forms disclosed. Many modifications, alterations and variations will be apparent to the practitioner skilled in the art. The embodiments were chosen and described in order to best explain the principles of the invention and its practical application, thereby enabling others skilled in the art to understand the invention for various embodiments and with various modifications that are suited to the particular use contemplated. It is intended that the scope of the invention be defined only by the scope of the following claims and their equivalence.

What is claimed is:

1. A tactile code for visually impaired persons, said tactile code comprising:
   a plurality of tactile perceptible cells, wherein each character of an alphabet is represented by one cell of the plurality of tactile perceptible cells and each one cell has a specific raised pattern, wherein a cell of the plurality of tactile perceptible cells comprises:
   a first region having a plurality of positions for use in indicating a plurality of lead characters, wherein a lead character of the plurality of lead characters is the lead character in a specific sequence of characters of the alphabet;
   a second region having a plurality of positions different from the plurality of positions of the first region, the plurality of positions in the second region for use in indicating a particular character from a set of characters of the alphabet, the set of characters including the lead character and a number of characters following the lead character in alphabetical order, said number of characters being less than the number of characters in the alphabet, and wherein the set of characters is different from one or more other sets of characters;
   a third region having a plurality of raised projections to assist in tactual perceptible identification of cell positions in the first region and the second region, wherein the plurality of raised projections include at least a number of raised projections equal to a number of positions in at least one of the first region and the second region, and wherein the plurality of raised projections indicate an ordinal position of said plurality of projections and each position in the first region and the second region corresponds to a specific raised projection; and
   a first raised perceptible indicium in one position in the first region and a second raised perceptible indicium in one or more positions of the second region which in combination indicate an intended character of the alphabet.

2. The tactile code of claim 1, wherein the first raised perceptible indicium is of one pattern and the second raised perceptible indicium is of another pattern.

3. The tactile code of claim 1, wherein the first raised perceptible indicium is of one pattern and the second raised perceptible indicium is of a same pattern.

4. The tactile code of claim 1, wherein the plurality of positions of the first region are used to indicate the vowels of the alphabet.

5. The tactile code of claim 4, wherein a first position of the first region corresponds to vowel A, a second position of the first region corresponds to vowel E, a third position of the first region corresponds to vowel I, a fourth position of the first region corresponds to vowel O, and a fifth position of the first region corresponds to vowel U.

6. The tactile code of claim 1, wherein an indicium in one position in the first region together with the same indicium in at least one position in the second region indicates a vowel as the intended character, wherein the vowel is dependent on position of the indicium in the first region.

7. The tactile code of claim 1, wherein an indicium in one position in the first region together with another indicium in one position in the second region, the another indicium being different from the indicium in the first region, indicates a consonant from a set of consonants, said set of consonants including a plurality of consonants following in alphabetical order the vowel corresponding to the one position in the first region and preceding the next vowel in alphabetical order.

8. The tactile code of claim 1, wherein a specific combination of a number of cells of the plurality of tactile perceptible cells comprises a word.

9. The tactile code of claim 1, wherein the plurality of tactile perceptible cells are optically or machine readable.

10. The tactile code of claim 1, wherein the intended character is a consonant of the alphabet and the first raised perceptible indicium is a star and the second raised perceptible indicium is a dash.

11. The tactile code of claim 1, wherein the intended character is a vowel of the alphabet and the first raised perceptible indicium is a star and the second raised perceptible indicium is a star.

12. The tactile code of claim 1, wherein the cell comprises three columns and five rows, and wherein column one is the first region, column three is the second region, and column two is the third region.

13. The tactile code of claim 1, wherein the cell comprises two rows, each row having ten positions, and wherein row 1, positions 1-5, are the first region; row 1, positions 6-10, are the second region; and row 2, positions 1-10, are the third region.

14. A tactile code for visually impaired persons, said tactile code comprising:
   a plurality of tactile perceptible cells, wherein each character of an alphabet is represented by one cell of the plurality of tactile perceptible cells and each one cell has a specific raised pattern, wherein a cell of the plurality of tactile perceptible cells comprises:
      a first region having a plurality of positions for use in indicating a plurality of lead characters, wherein a lead character of the plurality of lead characters is the lead character in a specific sequence of characters of the alphabet;
      a second region having a plurality of positions different from the plurality of positions of the first region, the plurality of positions in the second region for use in indicating a particular character from a set of characters of the alphabet, the set of characters including the lead character and a number of characters following the lead character in alphabetical order, said number of characters being less than the number of characters in the alphabet, and wherein the set of character is different from one or more other sets of characters; and
      a first raised perceptible indicium in one position in the first region and a second raised perceptible indicium in one or more positions of the second region which in combination indicate an intended character of the alphabet.

15. A device for providing a tactile code for visually impaired persons, said device comprising:
   an input device to provide on a tangible medium a cell of the tactile code, the cell representing a character of the alphabet, and wherein the cell comprises:
      a first region having a plurality of positions for use in indicating a plurality of lead characters, wherein a lead character of the plurality of lead characters is the lead character in a specific sequence of characters of the alphabet;
      a second region having a plurality of positions different from the plurality of positions of the first region, the plurality of positions in the second region for use in indicating a particular character from a set of characters of the alphabet, the set of characters including the lead character and a number of characters following the lead character in alphabetical order, said number of characters being less than the number of characters in the alphabet, and wherein the set of character is different from one or more other sets of characters; and
      a first raised perceptible indicium in one position in the first region and a second raised perceptible indicium in one or more positions of the second region which in combination indicate an intended character of the alphabet.

16. The device of claim 15, wherein the input device comprises a keyboard.

17. The device of claim 15, wherein the cell further comprises a third region having a plurality of raised projections to assist in tactual perceptible identification of cell positions in the first region and the second region, wherein the plurality of raised projections include at least a number of raised projections equal to a number of positions in at least one of the first region and the second region, and wherein the plurality of raised projections indicate an ordinal position of said plurality of projections and each position in the first region and the second region corresponds to a specific raised projection.

18. A method for providing a tactile code for visually impaired persons, said method comprising:
   providing on a tangible medium a tactile perceptible cell representing a character of an alphabet, wherein the cell has a specific raised pattern and comprises:
      a first region having a plurality of positions for use in indicating a plurality of lead characters, wherein a lead character of the plurality of lead characters is the lead character in a specific sequence of characters of the alphabet;
      a second region having a plurality of positions different from the plurality of positions of the first region, the plurality of positions in the second region for use in indicating a particular character from a set of characters of the alphabet, the set of characters including the lead character and a number of characters following the lead character in alphabetical order, said number of characters being less than the number of characters in the alphabet, and wherein the set of character is different from one or more other sets of characters; and
      a first raised perceptible indicium in one position in the first region and a second raised perceptible indicium in one or more positions of the second region which in combination indicate an intended character of the alphabet.

19. The method of claim 18, wherein the cell further comprises a third region having a plurality of raised projections to assist in tactual perceptible identification of cell positions in the first region and the second region, wherein the plurality of raised projections include at least a number of raised projections equal to a number of positions in at least one of the first region and the second region, and wherein the plurality of raised projections indicate an ordinal position of said plurality of projections and each position in the first region and the second region corresponds to a specific raised projection.

20. A tactile code for visually impaired persons, said tactile code comprising:

a plurality of tactile perceptible cells, wherein each number of a set of numbers is represented by one cell of the plurality of tactile perceptible cells and each one cell has a specific raised pattern, wherein a cell of the plurality of tactile perceptible cells comprises:

a first region having a plurality of positions for use in indicating a plurality of lead numbers, wherein a lead number of the plurality of lead numbers is the lead number in a specific sequence of numbers of a subset of numbers;

a second region having a plurality of positions different from the plurality of positions of the first region, the plurality of positions in the second region for use in indicating a particular number from the subset of numbers, the subset of numbers including the lead number and a plurality of numbers following the lead number in numerical order, said plurality of numbers being less than an amount of numbers in the set of numbers, and wherein the subset of numbers is different from one or more other subsets of numbers; and a first raised perceptible indicium in one position in the first region and a second raised perceptible indicium in one or more positions of the second region which in combination indicate an intended number of the subset of numbers.

21. The tactile code of claim 20, wherein the cell further comprises a third region having a plurality of raised projections to assist in tactual perceptible identification of cell positions in the first region and the second region, wherein the plurality of raised projections include at least a number of raised projections equal to a number of positions in at least one of the first region and the second region, and wherein the plurality of raised projections indicate an ordinal position of said plurality of projections and each position in the first region and the second region corresponds to a specific raised projection.

* * * * *